(12) United States Patent
Kim et al.

(10) Patent No.: US 10,708,880 B2
(45) Date of Patent: Jul. 7, 2020

(54) ELECTRONIC DEVICE AND METHOD FOR DETERMINING ENTRY OF REGION OF INTEREST OF ELECTRONIC DEVICE

(71) Applicant: Samsung Electronics Co., Ltd., Gyeonggi-do (KR)

(72) Inventors: Jin-Woo Kim, Seoul (KR); Bum-Soo Lee, Gyeonggi-do (KR); Youngpo Lee, Seoul (KR); Chai-Man Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/345,531

(22) PCT Filed: Oct. 30, 2017

(86) PCT No.: PCT/KR2017/012085
§ 371 (c)(1),
(2) Date: Apr. 26, 2019

(87) PCT Pub. No.: WO2018/080261
PCT Pub. Date: May 3, 2018

(65) Prior Publication Data
US 2019/0274115 A1    Sep. 5, 2019

(30) Foreign Application Priority Data
Oct. 28, 2016  (KR) .................. 10-2016-0142482

(51) Int. Cl.
*H04W 64/00* (2009.01)
*H04W 4/021* (2018.01)
(Continued)

(52) U.S. Cl.
CPC .......... *H04W 64/003* (2013.01); *H04W 4/02* (2013.01); *H04W 4/021* (2013.01); *H04W 4/025* (2013.01);
(Continued)

(58) Field of Classification Search
CPC ....... H04W 64/003; H04W 4/02; H04W 4/00; H04W 88/06; H04W 64/00; H04W 4/021;
(Continued)

(56) References Cited

U.S. PATENT DOCUMENTS

2008/0158060 A1    7/2008  Lee et al.
2008/0274752 A1*  11/2008  Houri .................. 455/456.1
(Continued)

FOREIGN PATENT DOCUMENTS

KR    1020080062202    7/2008
KR    1020090129835    12/2009
(Continued)

OTHER PUBLICATIONS

PCT/ISA/210 Search Report issued on PCT/KR2017/012085, pp. 5.
PCT/ISA/237 Written Opinion issued on PCT/KR2017/012085, pp. 5.

*Primary Examiner* — Meless N Zewdu
(74) *Attorney, Agent, or Firm* — The Farrell Law Firm, P.C.

(57) ABSTRACT

An electronic device according to various embodiments of the present invention may comprise: a communication circuit for communicating with at least one network; and a processor configured to obtain a location estimation region of the electronic device on the basis of the at least one network, via the communication circuit, and to determine whether the electronic device has entered a region of interest, on the basis of a correlation between a probability distribution for the obtained location estimation region and a probability distribution for a preset region of interest, wherein various embodiments are possible.

14 Claims, 11 Drawing Sheets

(51) Int. Cl.
  *H04W 84/12* (2009.01)
  *H04W 4/02* (2018.01)
  *H04W 88/06* (2009.01)
  *H04W 4/029* (2018.01)
(52) U.S. Cl.
  CPC ........... *H04W 4/029* (2018.02); *H04W 64/00* (2013.01); *H04W 64/006* (2013.01); *H04W 84/12* (2013.01); *H04W 88/06* (2013.01)
(58) Field of Classification Search
  CPC ... H04W 84/12; H04W 56/009; H04W 4/025; H04W 4/023; H04W 4/029; H04W 4/33; H04W 4/38; H04W 12/00503; H04W 12/1004; H04W 48/04; H04W 88/00; H04W 88/02; H04W 88/08; H04W 56/0095; H04W 40/023; H04W 64/006; H04W 68/00; H04W 80/00; H04W 92/1002; H04W 80/04; H04W 80/10; H04W 80/12; H04W 36/00837; H04W 36/24; H04W 36/30; H04W 60/04; H04W 88/005; G01S 5/02; G01S 1/76; G01S 1/807; G01S 3/12; G01S 5/14; G01S 5/30; G01S 19/06; G01S 19/252
  See application file for complete search history.

(56) References Cited

U.S. PATENT DOCUMENTS

| | | | |
|---|---|---|---|
| 2008/0299993 A1* | 12/2008 | Gordon et al. | 455/456.1 |
| 2009/0280829 A1* | 11/2009 | Feuerstein | 455/456.1 |
| 2009/0312037 A1 | 12/2009 | Jo et al. | |
| 2010/0318318 A1* | 12/2010 | Spiesberger | 702/150 |
| 2011/0250903 A1 | 10/2011 | Huang et al. | |
| 2012/0293372 A1* | 11/2012 | Amendolare et al. | 342/451 |
| 2015/0065173 A1* | 3/2015 | Pliner | 455/456.3 |
| 2015/0169794 A1* | 6/2015 | Maennel | |
| 2016/0061607 A1 | 3/2016 | Yang et al. | |
| 2016/0295373 A1* | 10/2016 | Ronen et al. | H04W 4/028 |
| 2017/0219681 A1* | 8/2017 | Ghinamo et al. | G01S 5/0252 |
| 2018/0077671 A1 | 3/2018 | Lee et al. | |
| 2019/0158607 A1* | 5/2019 | Kalis et al. | H04L 67/18 |

FOREIGN PATENT DOCUMENTS

| | | |
|---|---|---|
| KR | 101590519 | 2/2016 |
| KR | 1020160026707 | 3/2016 |
| KR | 1020160034138 | 3/2016 |
| KR | 1020180028697 | 3/2018 |

* cited by examiner

CENTRAL POINT($\mu_1$) RADIUS($r_1$)   LATITUDE-LONGITUDE COORDINATE SYSTEM

ELECTRONIC DEVICE AND METHOD FOR DETERMINING ENTRY OF REGION OF INTEREST OF ELECTRONIC DEVICE

PRIORITY

This application is a National Phase Entry of International Application No. PCT/KR2017/012085, which was filed on Oct. 30, 2017, and claims priority to Korean Patent Application No. 10-2016-0142482, which was filed on Oct. 28, 2016, the content of each of which are incorporated herein by reference.

TECHNICAL FIELD

Various embodiments of the present disclosure relate to an electronic device having a communication function, for example, a method and apparatus for determining whether the electronic device enters a region of interest based on at least one wireless network.

BACKGROUND ART

Electronic devices (e.g., mobile terminals) have become widely available and highly mobile. For example, various position-based services such as positioning and tracking of the electronic device, advertising pushes, providing location customized information, etc., may be supported based on a position of the electronic device. To this end, a need exists for a method to accurately determine whether the electronic device enters a preset region of interest by measuring the position of the electronic device.

DETAILED DESCRIPTION OF THE INVENTION

Technical Problem

A position estimation method for the electronic device may be roughly classified into a scheme using a satellite signal and a scheme using a wireless network. A global positioning system (GPS)-based positioning system using the satellite signal may estimate a position of the electronic device as one point. In environments such as indoors or in downtown areas, reception of a GPS signal can be limited due to various obstacles making it difficult to use the positioning system. Wireless network-based position estimation for the electronic device, unlike the GPS-based positioning system, may obtain the position of the electronic device as a coverage or a region based on wireless network information received from at least one wireless node (e.g., base stations, cells, or wireless local area network (WLAN) access points (APs)), etc.

In wireless network-based position estimation for the electronic device, the position of the electronic device may be obtained from the coverage or the region, and in a case where the estimated position of the electronic device is obtained from the coverage or the region, the position of the electronic device may be stochastically estimated. Moreover, in a case where the estimated position of the electronic device is obtained from the coverage or the region, entry of the electronic device to a region of interest may be stochastically identified by comparison between regions rather than between a point and a region.

According to various embodiments of the present disclosure, there is provided an electronic device that identifies entry thereof to a region of interest based on a correlation between a probability density distribution of a position estimation region of the electronic device obtained based on at least one wireless network and a probability density distribution of a region of interest and a method for identifying the entry to the region of interest in the electronic device.

Technical Solution

According to various embodiments of the present disclosure, an electronic device includes a communication circuit configured to communicate with at least one network and a processor configured to obtain a position estimation region of the electronic device based on at least one network via the communication circuit and to determine whether the electronic device has entered a preset region of interest, based on a correlation between a probability distribution for the obtained position estimation region and a probability distribution for the preset region of interest.

According to various embodiments of the present disclosure, an electronic device includes a communication circuit configured to communicate with a plurality of networks and a processor configured to obtain a first position estimation region of the electronic device based on a first network among the plurality of networks via the communication circuit, to determine whether the electronic device has entered a preset region of interest, based on the obtained first position estimation region, to obtain a second position estimation region of the electronic device based on a second network among the plurality of networks via the communication circuit when a result of the determination based on the first position estimation region does not satisfy a preset condition, and to determine whether the electronic device has entered the preset region of interest, based on the obtained second position estimation region.

According to various embodiments of the present disclosure, a method for determining whether an electronic device has entered a region of interest includes obtaining a position estimation region of the electronic device based on at least one network, obtaining a correlation between a probability distribution for the obtained position estimation region and a probability distribution for the region of interest, and determining whether the electronic device has entered the region of interest based on the obtained correlation.

Advantageous Effects

According to various embodiments of the present disclosure, in position estimation of the electronic device based on a wireless network, the estimated position is provided as a coverage or a region such that the position of the electronic device may be stochastically estimated, and the entry of the electronic device to the region of interest in a three-dimensional (3D) space may be stochastically identified based on probability density distributions between the position estimation region of the electronic device and the region of interest.

Moreover, according to various embodiments of the present disclosure, in position estimation of the electronic device based on a wireless network, as the position estimation region of the electronic device or the accuracy of identification may vary with a type, characteristics, and/or a reception state, etc., of the wireless network, the accuracy of identification of the entry to the region of interest may be improved by identifying the entry based on position estimation regions obtained differently via at least two heterogeneous networks.

Furthermore, according to various embodiments of the present disclosure, a result of determination of whether the electronic device has entered the region of interest based on the wireless network may be used for various position-based services such as position identification and tracking, notification of entry/leaving to/from the region of interest, information (e.g., an advertisement or a coupon) push and/or providing of information (e.g., traffic information, bus line information, or famous restaurant information, etc.).

MODE FOR CARRYING OUT THE INVENTION

Figure 1:
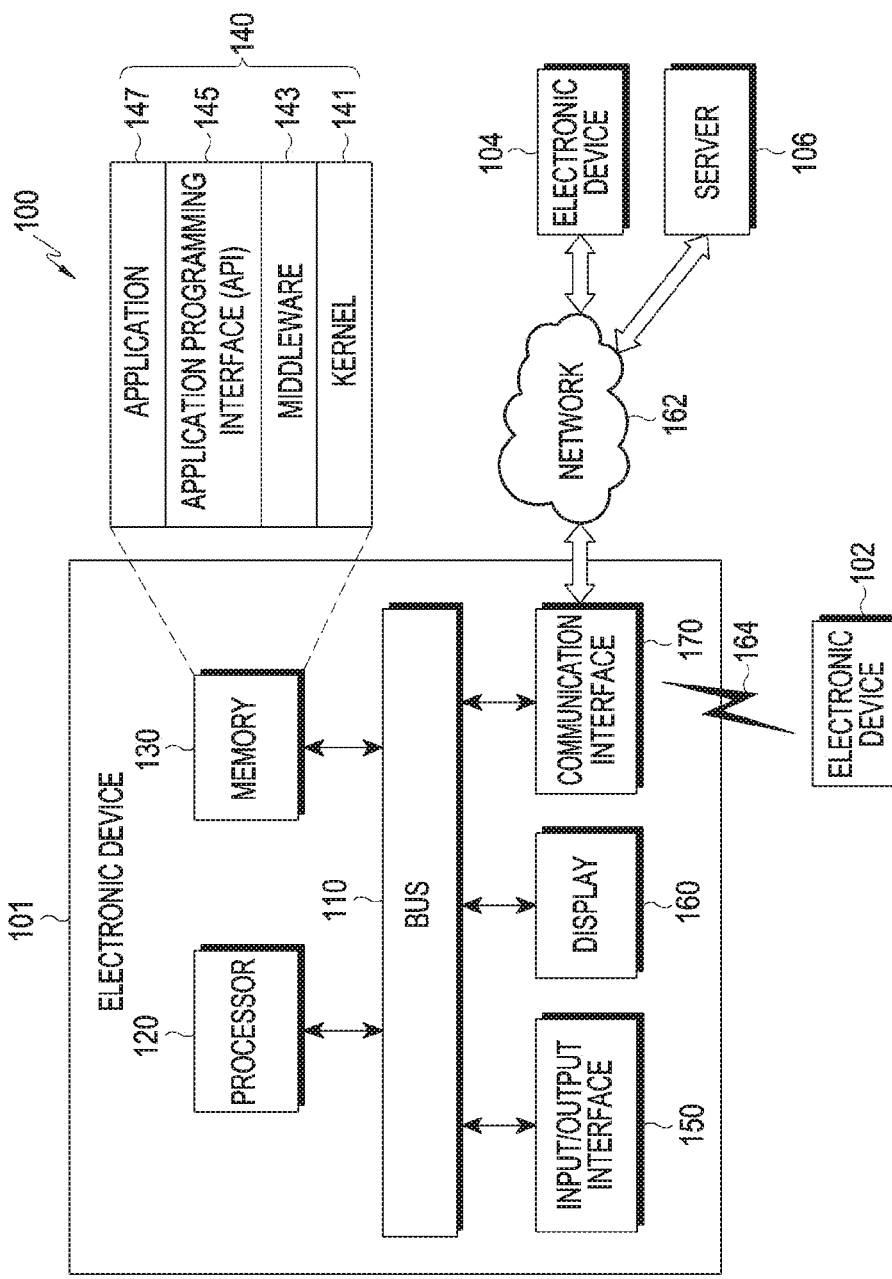
FIG. 1 illustrates a network environment including an electronic device according to various embodiments of the present disclosure.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. It is to be understood that a singular form of a noun corresponding to an item may include one or more of the things, unless the relevant context clearly indicates otherwise. In the present disclosure, an expression such as "A or B," "at least one of A and/or B," or "one or more of A and/or B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situations, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device.

Examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, the electronic device may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, a drone, an automatic teller's machine (ATM), a Point of Sale (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a piece of furniture, a building/structure, or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device (e.g., an artificial intelligence electronic device) using the electronic device.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message or data) between the elements 110 to 170.

The processor 120 may include one or more of a central processing unit (CPU), an application processor (AP), and a communication processor (CP). The processor 120 performs operations or data processing for control and/or communication of, for example, at least one of the other elements of the electronic device 101.

The memory 130 may include a volatile and/or nonvolatile memory. The memory 130 may store, for example, instructions or data associated with at least one of the other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like.

At least some of the kernel 141, the middleware 143, and the API 145 may be referred to as an operating system (OS). The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests.

The API 145 is an interface used for the application 147 to control a function provided by the kernel 141 or the middleware 143, and may include, for example, at least one interface or function (e.g., an instruction) for file control, window control, image processing or character control.

The I/O interface 150 may deliver, for example, an instruction or data input from a user or another external device to other component(s) of the electronic device 101, or output an instruction or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touchscreen, and receive a touch, a gesture, proximity, or a hovering input, for example, by using an electronic pen or a part of the body of a user.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

Wireless communication may include a cellular communication protocol using at least one of, for example, long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and so forth. According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include a global navigation satellite system (GNSS). The GNSS may include, for example, at least one of a global positioning system (GPS), a global navigation satellite system (GLONASS), a Beidou navigation satellite system ("Beidou"), and Galileo, the European global satellite-based navigation system. Hereinbelow, "GPS" may be used interchangeably with "GNSS". The wired communication may include, for example, at least one of a universal serial bus (USB), a high definition multimedia interface (HDMI), a recommended standard (RS)-232, power line communication, a plain old telephone service (POTS), and so forth. The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional functions and deliver the execution result to the electronic device 101. The electronic device 101 may then process or further process the received result to provide the requested function or service. To that end, a cloud computing, distributed computing, or client-server computing technology may be used, for example.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

Figure 2:
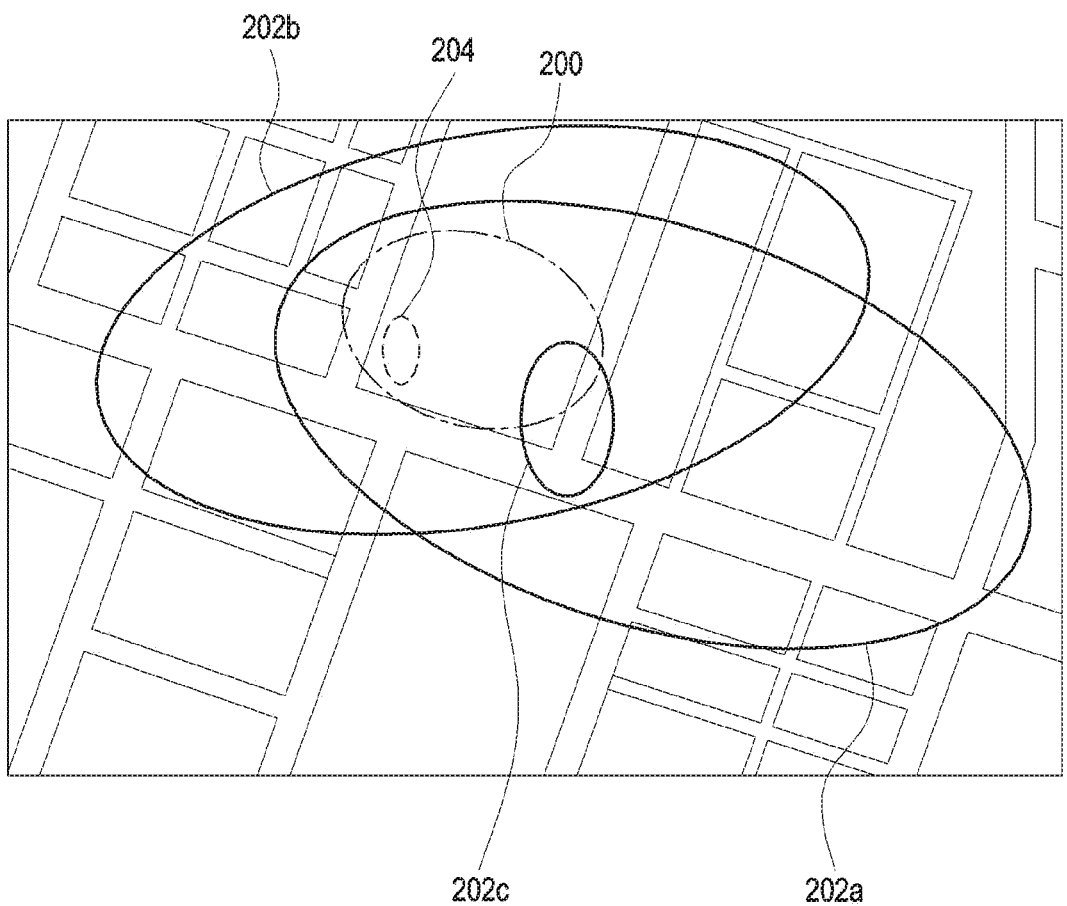
FIG. 2 is a view for describing a region of interest entry probability based on a plurality of position estimation regions of an electronic device, according to various embodiments of the present disclosure.

FIG. 2 is a view for describing a region of interest entry probability based on a plurality of position or location estimation regions of an electronic device, according to various embodiments of the present disclosure.

FIG. 2 show a plurality of position estimation regions of the electronic device (e.g., position estimation regions 202a through 202c based on first wireless networks of different types and a position estimation region 204 based on a second wireless network) and a region 200 of interest registered in the electronic device.

In the present disclosure, the position estimation region may mean a region that may be estimated as a geographical position in which the electronic device is actually located, and the position estimation region of the electronic device may be determined based on at least one wireless network to which the electronic device is accessing or is located adjacent. For example, the electronic device may estimate a geographical region in which the electronic device is actually located, according to various estimation methods using at least one of a plurality of wireless networks to which the electronic device is accessing or located adjacent, and the electronic device may determine the estimated geographical region as the position estimation region of the electronic device. As illustrated in FIG. 2, the position estimation region of the electronic device may include a plurality of position estimation regions (e.g., the position estimation regions 202a through 202c based on the first wireless networks of different types and the position estimation region 204 based on the second wireless network) that are estimated differently according to the various estimation methods using various wireless networks. The region of interest may mean a geographical region the user desires to designate, and the user may set or register the region of interest in the electronic device.

According to an embodiment of the present disclosure, the plurality of wireless networks may include at least one of the first wireless network or the second wireless network.

According to an embodiment of the present disclosure, the first wireless network may include a cellular-based network, e.g., at least one of LTE, LTE-A, CDMA, WCDMA, UMTS, WiBro, or GSM. For example, the position estimation regions 202a through 202c illustrated in FIG. 2 may indicate position estimation regions of the electronic device obtained through different cellular-based networks or position estimation regions of the electronic device obtained based on one identical cellular-based network at different times or depending on different reception states.

According to an embodiment of the present disclosure, the second wireless network may include a WLAN-based network, e.g., at least one of WiFi, Bluetooth, NFC, ZigBee, Z-Wave, or GNSS. For example, the position estimation region 204 illustrated in FIG. 2 may indicate the position estimation region of the electronic device obtained through the WLAN-based network (e.g., WiFi).

The position estimation regions of the electronic device may be obtained by being estimated differently depending on a type, characteristics, and/or a reception state of each wireless network. Region of interest entry probabilities of the electronic device based on the position estimation regions of the electronic device obtained differently may also differ. Based on such various position estimation regions, entry of the electronic device to a region of interest may be identified in various ways.

Figure 3:
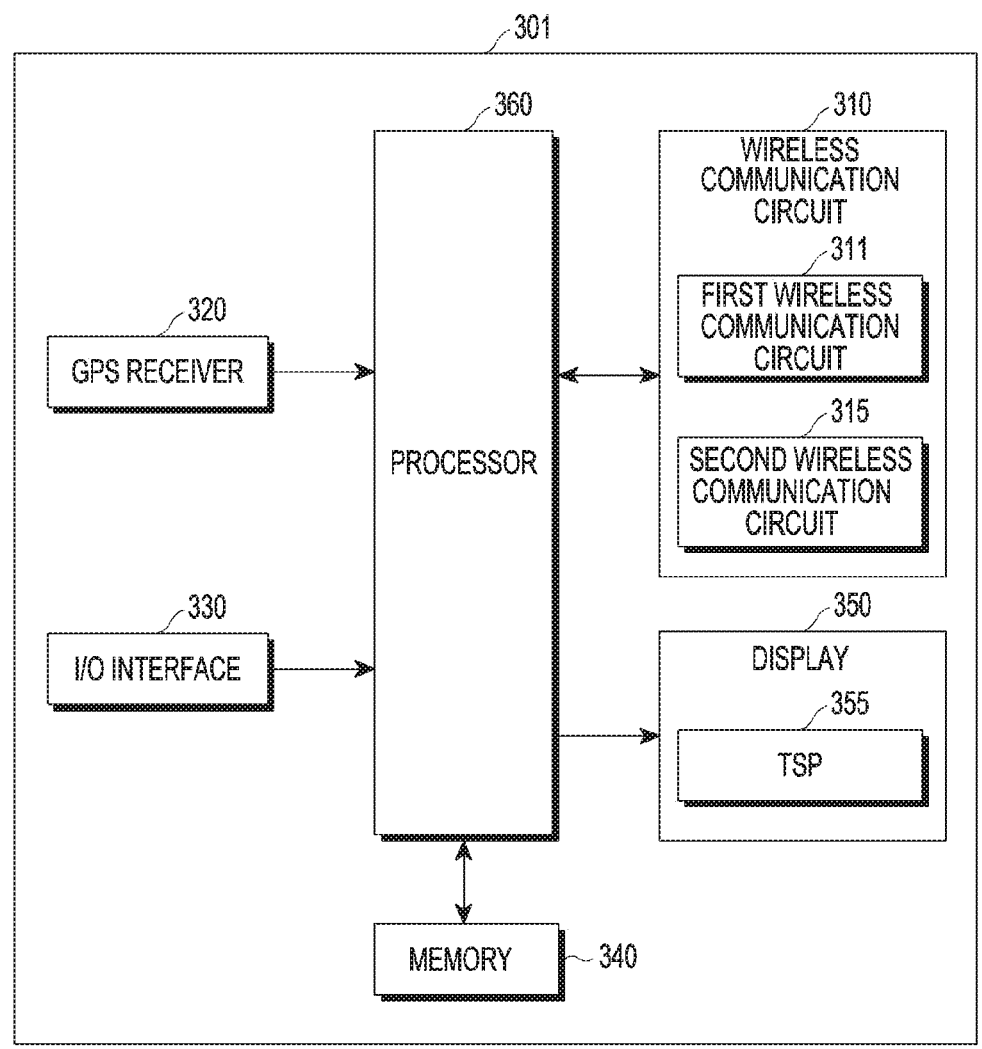
FIG. 3 is a block diagram of an electronic device according to various embodiments of the present disclosure.

FIG. 3 is a block diagram of an electronic device according to various embodiments of the present disclosure.

Referring to FIG. 3, an electronic device 301 according to various embodiments of the present disclosure may include the entire electronic device 101 illustrated in FIG. 1 or a part thereof. The electronic device 301 may include at least one of a wireless communication circuit 310, a GPS receiver 320, an I/O interface 330, a memory 340, a display 350, or at least one processor 360.

The wireless communication circuit 310 may establish a communication connection for transmitting and receiving data based on a wireless network. The wireless communication circuit 310 may include the entire communication interface 170 illustrated in FIG. 1 or a part thereof. The wireless communication circuit 310 may be referred to as a communication unit or a communication module, may include the communication unit or the communication module as a part thereof, or may constitute the communication unit or the communication module.

The wireless communication circuit 310 may include, for example, a first wireless communication circuit 311 and a second wireless communication circuit 315.

According to an embodiment of the present disclosure, the first wireless communication circuit 311 may provide a service based on a first wireless network. For example, the wireless communication circuit 310 may transmit and receive various cellular data by performing communication connection with at least one node (e.g., base stations or cells) connected with a cellular-based network through the first wireless communication circuit 311. The first wireless communication circuit 311 may include at least one of a computer network (e.g., a LAN or WAN), Internet, or a telephone network.

According to an embodiment of the present disclosure, the second wireless communication circuit 315 may provide data based on a second wireless network. For example, the wireless communication circuit 310 may transmit and receive various WLAN data by performing communication connection with at least one node (e.g., WLAN APs) connected with a WLAN-based network through the second wireless communication circuit 315. For example, the second communication circuit 315 may include at least one of WiFi, BT, NFC, ZigBee, Z-Wave, a GNSS, etc.

The wireless communication circuit 310 may receive information from at least one node (e.g., base stations, cells, or APs) through at least one of the first wireless communication circuit 311 or the second wireless communication circuit 315. For example, the information may include at least one of cellular-based data or WLAN-based data received from the at least one node.

According to an embodiment of the present disclosure, the cellular-based data may include, for example, base station information (or cell information), and the base station information may include cell (e.g., serving cell) information regarding a base station to which the electronic device 301 is accessing and cell (e.g., neighbor cell) information regarding at least one neighbor base station located adjacent to the base station. The serving cell information may include, for example, network information, identification information, and measurement information. The network information may include at least one of a mobile country code (MCC), a mobile network code (MNC), a radio access technology (RAT), a tracking area code (TAC), or a combination thereof. The identification information may include at least one of a global cell identifier (GCI), a physical cell identifier (PCI), an Evolved Universal Terrestrial Radio Access (E-UTRA) absolute radio frequency channel number (EARFCN), or a combination thereof. The measurement information may include at least one of a received signal strength indication (RSSI), a reference signal received quality (RSRQ), a signal-to-noise ratio (SNR), a reference signal receive power (RSRP), a time advance (TA), or a combination thereof. The neighbor cell information may include identification information and measurement information, in which the identification information may include at least one of a PCI, an EARFCN, or a combination thereof. The measurement information may include an RSRP.

According to an embodiment of the present disclosure, the WLAN-based data may include at least a part of identification information (e.g., a media access control (MAC) address, an Internet protocol (IP) address, or a universal unique identifier (UUID)), geographical location information (e.g., latitude-longitude coordinates), and administrative location information (e.g., city/district/province information) of a WLAN AP to which the electronic device 301 is accessing, hotspot information indicating an area where the WLAN AP is installed and thus communication is possible, measurement information (e.g., an RSSI), or a combination thereof.

The GPS receiver 320 may receive location information of the electronic device 301 from a GPS satellite. The location information may include at least one of a longitude, a latitude, an accuracy, or a combination thereof.

The I/O interface 330 may include the entire input/output interface 150 illustrated in FIG. 1 or a part thereof. For example, when the user desires to register a region of interest, the user may input parameters related to the region of interest to be registered through the I/O interface 330. For example, a parameter related to the region of interest may include central coordinates of the region of interest, a radius of the region of interest, or a separator (e.g., a check box or an option box) indicating selection or non-selection of the region of interest to register or release the region of interest in an application related to a service for providing notification of entry/leaving to/from the region of interest. In the present disclosure, the registered region of interest may have a circular shape.

The memory 340 may store instructions or data related to at least one other elements of the electronic device 301. The electronic device 340 may include the memory 130 illustrated in FIG. 1 or a part thereof. The memory 340 may include, for example, an internal memory (not shown) or an external memory (not shown). The internal memory (not shown) may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory (not shown) may further include flash drive, for example, compact flash (CF), secure digital (SD), micro-SD, mini-SD, extreme Digital (xD), a multi-media card (MMC), or a memory stick. The external memory (not shown) may be functionally or physically connected with the electronic device 301 through various interfaces.

The memory 340 may store the region of interest selected based on the central coordinates of the region of interest, the radius of the region of interest, or the separator input through the I/O interface 330. The memory 340 may store at least a part of first wireless network information (e.g., cellular data) or second wireless network information (e.g., WLAN data) received through the wireless communication circuit 310. The memory 340 may store at least one position estimation region of the electronic device, obtained based on the received first or second wireless network information. In the present disclosure, the obtained position estimation region may have a circular or oval shape. The memory 340 may store at least one of a temporary operational value generated in calculation of a correlation between the position estimation region or the region of interest, or probability density distributions to identify the entry of the electronic device 301 to the region of interest.

The display 350 may include a touch screen panel (TSP) 355. The TSP 355 may provide the user with a user interface corresponding to various services (e.g., call, data transmission, broadcasting, photo-taking, etc.). The TSP 355 may transmit a (analog) signal corresponding to at least one touch input to the user interface to the processor 360. The TSP 355 may receive an input of at least one touch made using a user's body (e.g., a finger) or a touchable input means (e.g., a touch pen). For example, in registration of the region of interest, the TSP 355 may receive an input of a touch of the central coordinates of the region of interest, the radius of the region of interest, or the separator indicating selection or non-selection of the region of interest to register or release the region of interest in the application related to the service for providing notification of entry/leaving to/from the region of interest. In registration of the region of interest through the TSP 355, at least one of the central coordinates or radius of the region of interest may be previously designated. In this case, the TSP 355 may simply receive an input for the region of interest.

According to an embodiment of the present disclosure, in a case where the radius of the region of interest is designated in registration of the region of interest, when the user performs an application related to registration of the region of interest to register the region of interest, a specific map may be displayed on the display 350 of the electronic device 301. When the user touches a position to be registered as a region of interest on the map displayed on the display 350, the touched position may be detected and input as the central coordinates through the TSP 355, and the region of interest corresponding to the radius designated around the touched position may be automatically formed.

According to an embodiment of the present disclosure, in a case where the central coordinates of the region of interest are designated in registration of the region of interest, when the user performs the application related to registration of the region of interest to register the region of interest, separators (e.g., selection boxes or option boxes) for selecting one of a plurality of radiuses with respect to the central coordinates may be displayed, or an input field that allows user's direct input thereto may be displayed. When the user selects a separator (e.g., a selection box or an option box) corresponding to a desired radius among a plurality of radiuses displayed on the display 350 by touching the separator or directly inputs the desired radius to the input field, the region of interest corresponding to the selected or input radius with respect to the designated central coordinates may be automatically formed.

According to an embodiment of the present disclosure, when the user performs the application related to registration of the region of interest, the specific map may be displayed on the display 350 of the electronic device 301. As the user adjusts an interval between two touched positions by swiping to narrow or widen the interval on the specific map displayed on the display 350 of the electronic device 301, a position (e.g., central coordinates) in which and a size (e.g., a radius) by which the region of interest is to be registered may be detected and input through the TSP 355. That is, when a specific region is input by a user's swiping touch through the TSP 355, the electronic device 301 may detect a central position of the input region as the central coordinates of the region of interest and a size, i.e., a radius, of the input region as the radius of the region of interest and register the region of interest.

According to an embodiment of the present disclosure, the electronic device 301 may receive an input of a touch for releasing the registered region of interest through the TSP 355. For example, the user may execute the application related to registration of the region of interest and touch a separator (e.g., a check box or an option box) for the registered region of interest displayed on the TSP 355 to release selection of the registered region of interest, such that the electronic device 301 may release the registered region of interest.

The processor 360 may control the electronic device 301 according to various embodiments of the present disclosure overall. The processor 360 may include the processor 120 illustrated in FIG. 1 or a part thereof. The processor 360 controls multiple hardware or software components connected to the processor 210 by driving an operating system (OS) or an application program, and performs processing and operations with respect to various data. The processor 360 may be implemented with, for example, a system on chip (SoC). According to an embodiment, the processor 360 may further include a graphic processing unit (GPU) and/or an image signal processor.

The processor 360 may determine whether the electronic device 301 enters the region of interest in various ways based on at least one of a plurality of wireless networks.

According to an embodiment of the present disclosure, the processor 360 may determine whether the electronic device 301 enters the region of interest based on at least one of the plurality of wireless networks. For example, the processor 360 may obtain a position estimation region of the electronic device by estimating a region where the electronic device is located based on wireless network information received through at least one of the plurality of wireless networks. The processor 360 may obtain a correlation between a probability density distribution for the obtained position estimation region and a probability density distribution for the set region of interest. The processor 360 may determine whether the electronic device 301 enters the region of interest based on the obtained correlation through a homogeneous wireless network among the plurality of wireless networks. For example, the processor 360 may determine that the electronic device 301 has entered the region of interest when the obtained correlation is greater than or equal to a designated threshold value, and may determine that the electronic device 301 has not entered the region of interest when the correlation is less than the threshold value. When the processor 360 determines that the electronic device 301 does not enter the region of interest, the processor 360 may re-estimate and obtain a position estimation region of the electronic device 301 based on the at least one of the plurality of wireless networks after a designated delay time and obtain again the correlation based on the obtained position estimation region and determine whether the electronic device 301 enters the region of interest.

According to an embodiment of the present disclosure, the processor 360 may determine whether the electronic device 301 enters the region of interest based on at least two heterogeneous wireless networks among the plurality of wireless networks. For example, the processor 360 may obtain a first position estimation region of the electronic device by estimating a region where the electronic device is located based on first wireless network information received via a first wireless network among the plurality of wireless networks. The processor 360 may obtain a first correlation between a probability density distribution for the obtained first position estimation region and a probability density distribution for the set region of interest. The processor 360 may primarily determine whether the electronic device 301 enters the region of interest based on the obtained first correlation via the first wireless network. For example, the processor 360 may determine that the electronic device 301 has entered the region of interest when the obtained first correlation is greater than or equal to a preset first threshold value, and may determine that the electronic device 301 has not entered the region of interest when the obtained first correlation is less than a preset second threshold value. In a case where the obtained first correlation is between the first threshold value and the second threshold value, the processor 360 may obtain a second correlation via the second wireless network among the plurality of wireless networks.

For example, the processor 360 may obtain a second position estimation region of the electronic device 301 by estimating a region where the electronic device 301 is located based on the second wireless network. The processor 360 may obtain a second correlation between a probability density distribution for the obtained second position estimation region and a probability density distribution for the preset region of interest. The processor 360 may secondarily determine whether the electronic device 301 enters the region of interest based on the obtained second correlation. For example, the processor 360 may determine that the electronic device 301 has entered the region of interest when the obtained second correlation is greater than or equal to a preset third threshold value, and may determine that the electronic device 301 has not entered the region of interest when the obtained second correlation is less than the third threshold value. When the processor 360 determines that the electronic device 301 does not enter the region of interest, the processor 360 may re-estimate and obtain a second position estimation region of the electronic device 301 based on the second wireless network among the plurality of wireless networks after a designated delay time, re-obtain the second correlation based on the obtained second position estimation region, and update the correlation. The electronic device 301 may re-determine whether the electronic device 301 enters the region of interest.

According to an embodiment of the present disclosure, the first wireless network may include a cellular-based network, and the second wireless network may include a WLAN-based network.

The processor 360 may perform a designated operation depending on whether the electronic device 301 enters the region of interest.

According to an embodiment of the present disclosure, the processor 360 may perform a designated operation corresponding to entry to the region of interest. For example, the designated operation may include at least one of notification of entry/leaving to/from the region of interest, information push, or information providing. The processor 360 may perform a notification operation of notifying entry of the electronic device to the region of interest to applications/services corresponding to entry to the region of interest. The processor 360 may also perform an information push operation of receiving an advertisement, a discount coupon, etc., from the applications/services corresponding to entry to the region of interest. The processor 360 may also perform an information providing operation of providing location-based information (e.g., traffic information, bus line, advertisement, and/or famous restaurant information, etc.) from the applications/services corresponding to entry to the region of interest.

According to an embodiment of the present disclosure, the processor 360 may perform a designated operation corresponding to leaving of the electronic device 301 from the region of interest, and for example, the designated operation may include a notification of leaving from the region of interest. For example, when determining that the electronic device 301 has entered the region of interest, the processor 360 may further determine whether the electronic device 301 has left the region of interest after entering the region of interest. When determining that the electronic device 301 enters the region of interest and then leaves the region of interest, the processor 360 may perform an operation of notifying leaving of the electronic device 301 from the region of interest to applications/services corresponding to leaving from the region of interest and then terminate the operation.

To obtain a correlation between probability density distributions for the position estimation region and the region of interest, the processor 360 may generate a probability density distribution for the position estimation region and a probability density distribution for the region of interest. Generation of a probability density distribution for a specific region such as the position estimation region or the region of interest will be described in more detail with reference to FIGS. 4A through 4C and 5.

Figure 4A:
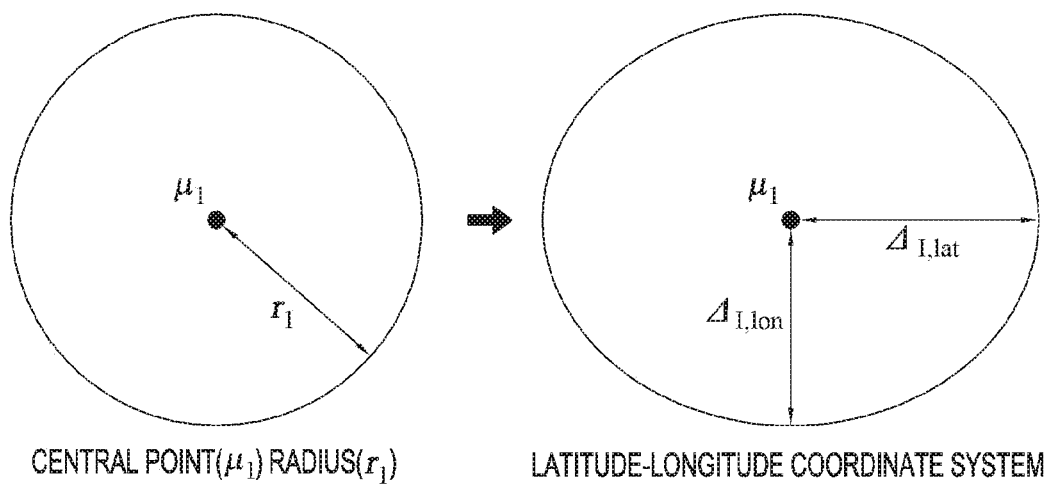
FIG. 4A is a view for describing a method for transforming a region into a latitude-longitude coordinate system, according to various embodiments of the present disclosure.
Figure 4B:
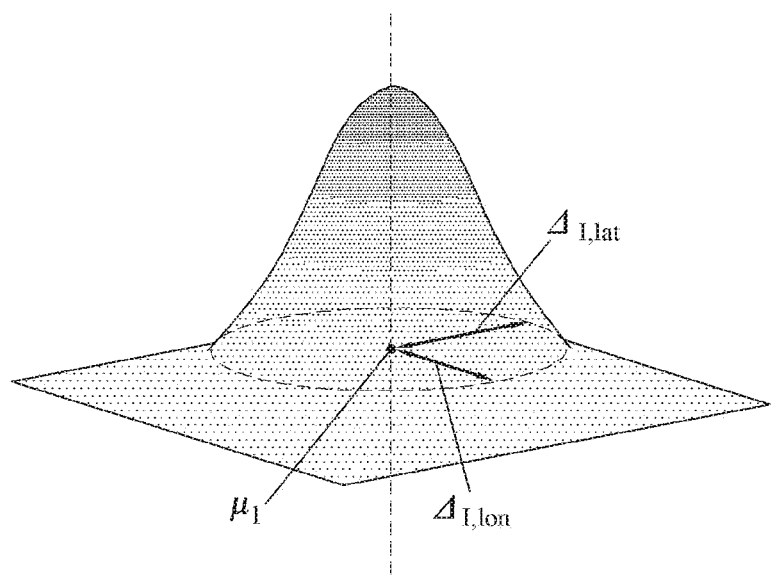
FIG. 4B is a view for describing a method for calculating a distance between two points in a latitude-longitude coordinate system transformed corresponding to a region, according to various embodiments of the present disclosure.
Figure 4C:
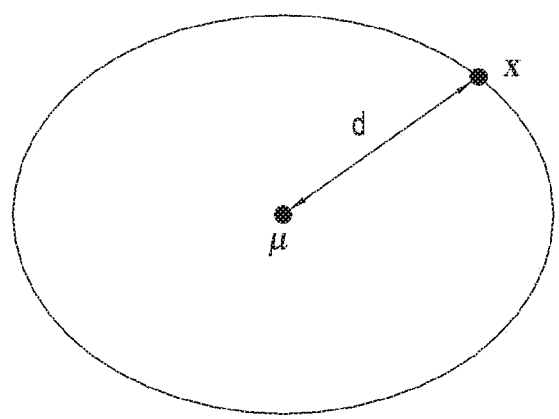
FIG. 4C illustrates a probability density distribution transformed corresponding to a region, according to various embodiments of the present disclosure.

FIG. 4A is a view for describing a method for transforming a region into a latitude-longitude coordinate system, according to various embodiments of the present disclosure, FIG. 4B is a view for describing a method for calculating a distance between two points in a latitude-longitude coordinate system transformed corresponding to a region, according to various embodiments of the present disclosure, and FIG. 4C illustrates a probability density distribution transformed corresponding to a region, according to various embodiments of the present disclosure. In the current embodiment, the region is assumed to have a circular shape.

Referring to FIG. 4A, the processor 360 may generate a probability density distribution of the region based on central coordinates $\mu_1$ and a radius $r_1$ of a region such as the position estimation region or the region of interest.

For example, the processor 360 may obtain the input or obtained central coordinates $\mu_1$ and radius $r_1$ of the region. The central coordinates $\mu_1$ and the radius $r_1$ of the region may be extracted based on a position and a size of the region, input or obtained via the I/O interface 330 or the TSP 355 from the user of the electronic device 301.

The processor 360 may calculate central coordinates, semi major radius, and semi minor radius corresponding to a latitude-longitude coordinate system transformed based on the central coordinates $\mu_1$ and the radius $r_1$ of the region. For example, the processor 360 may transform the region into the latitude-longitude coordinate system on the surface by using the obtained central coordinates $\mu_1$ and radius $r_1$ of the region. When the central coordinates it are transformed into the latitude-longitude coordinate system on the surface, the central coordinates $\mu_1$ may have latitude-longitude coordinate values with a latitude along a vertical axis and a longitude along a horizontal axis. The region may have different latitude length and longitude length corresponding to the same distance in meters, and in this case, the region may be transformed into an oval shape.

When transforming the central coordinates $\mu_1$ into the latitude-longitude coordinate system, the processor 360 may calculate semi major radius and semi minor radius of the region in the oval shape based on latitude-longitude coordinate values of the transformed central coordinates and the radius $r_1$. For example, the processor 360 may calculate a distance corresponding to the radius $r_1$ along the horizontal axis with respect to the latitude coordinate value of the central coordinates $\mu_1$ as a semi major radius ($\Delta_{I,lat}$) of the region. The processor 360 may calculate a distance corresponding to the radius $r_1$ along the vertical axis with respect to the longitude coordinate value of the central coordinates $\mu_1$ as a semi minor radius ($\Delta_{I,lon}$) of the region. In the present disclosure, while it is described that the semi major radius ($\Delta_{I,lat}$) is calculated corresponding to the radius $r_1$ with respect to the latitude coordinate value and the semi minor radius ($\Delta_{I,lon}$) is calculated corresponding to the radius $r_1$ with respect to the longitude coordinate value, the present disclosure is not limited thereto, and on the contrary, the semi major radius may be ($\Delta_{I,lon}$) calculated corresponding to the radius $r_1$ with respect to the longitude coordinate value, and the semi minor radius may be ($\Delta_{I,lat}$) calculated corresponding to the radius $r_1$ with respect to the latitude coordinate value. Hereinbelow, it is assumed that for convenience, the semi major radius and the semi minor radius correspond to the former case.

The semi major radius ($\Delta_{I,lat}$) and the semi minor radius ($\Delta_{I,lon}$) of the region using the central coordinates $\mu_1$ and the radius $r_1$ may be expressed as below.

For example, one point x on the surface may be expressed with coordinates $x=[x_{lon} x_{lat}]^T$ with a latitude along the horizontal axis and a longitude along the vertical axis, and a distance in meters, $d(x_A, x_B)$, between two points $x_A=[x_{A,lon} x_{A,lat}]^T$ and $x_B=[x_{B,lon} x_{B,lat}]^T$ may be given as below.

$$d(x_A, x_B) = 2R_{earth} \operatorname{atan}\left(\frac{\sqrt{a}}{\sqrt{1-a}}\right) \quad \text{[Equation 1]}$$

Herein, $R_{earth}$ is a radius of the Earth and $\alpha$ is a constant indicating a haversine value, in which $\alpha$ may be obtained as below.

$$a = \sin^2\left(\frac{x_{A,lat} - x_{B,lat}}{2}\right) + \cos(x_{A,lat})\cos(x_{B,lat})\sin^2\left(\frac{x_{A,lon} - x_{B,lon}}{2}\right) \quad \text{[Equation 2]}$$

Thus, when a distance between two points having coordinates of $x_A=[x_{B,lon}+\Delta_{lon}\ x_{B,lat}]^T$ and $x_B=[x_{B,lon}\ x_{B,lat}]^T$ is given as $\tilde{d}$, $\Delta_{lon}$ corresponding to $\tilde{d}$ may be obtained using Equation 3.

$$\Delta_{lon} = 2\sin^{-1}\left(\frac{\sin\left(\frac{\tilde{d}}{2R_{earth}}\right)}{\cos(x_{B,lat})}\right) \quad \text{[Equation 3]}$$

Likewise, when a distance between two points having coordinates of $x_A=[x_{B,lon}\ x_{B,lat}+\Delta_{lat}]^T$ and $x_B=[x_{B,lon}\ x_{B,lat}]^T$ is given as $\tilde{d}$, $\Delta_{lat}$ corresponding to $\tilde{d}$ may be obtained using Equation 4.

$$\Delta_{lat} = \frac{\tilde{d}}{R_{earth}} \quad \text{[Equation 4]}$$

The processor 360 may normalize the region based on the calculated semi major radius ($\Delta_{I,lat}$) and semi minor radius ($\Delta_{I,lon}$), thus transforming the region into the probability density distribution as illustrated in FIG. 4B.

Referring to FIG. 4B, the processor 360 may transform the region into a probability density distribution by normalizing the region into a normal distribution by using the calculated semi major radius ($\Delta_{I,lat}$) and semi minor radius ($\Delta_{I,lon}$) and the central coordinates $\mu_1$ of the region. According to an embodiment of the present disclosure, the normal distribution used in normalization may include a two-dimensional (2D) normal distribution.

As illustrated in FIG. 4B, a probability density may be highest in the central coordinates pi and may decrease toward an edge of the radius $r_1$ from the central coordinates pi.

A method for transforming the oval-shape region transformed into the latitude-longitude coordinate system as illustrated in FIG. 4A into the probability density distribution as illustrated in FIG. 4C described above may be mathematically expressed as below.

Referring to FIG. 4C, a distance d between a central point $\mu$ of an oval and a point $x=[x_{A,lon}\ x_{A,lat}]^T$ on the oval may be expressed using a Mahalanobis distance as Equation 5.

$$(x-\mu)^T \Sigma^{-1}(x-\mu) = K \quad \text{[Equation 5]}$$

Herein, $\mu=[\mu_{lon}\ \mu_{lat}]^T$ indicates a central point of an oval, a covariance matrix $\Sigma$ (e.g., 2×2 matrix) determines a shape of an oval, and a constant K is related to a size of the oval. K means a Mahalanobis distance between a point x on the oval and a probability density distribution as illustrated in FIG. 4C, in which as K increases, the distance between the center of the probability density distribution and the point x increases, which may mean that the size of the oval increases.

When a horizontal axis and a vertical axis of an oval defined in the latitude-longitude coordinate system are parallel to a longitude direction and a latitude direction, the covariance matrix $\Sigma$ may be expressed as, for example, a diagonal matrix.

For example, a probability variable following a normal distribution in a point $x_A=[x_{A,lon}\ x_{A,lat}]^T$ of the oval-shape region transformed into the latitude-longitude coordinate system may be expressed as $x_A \sim N(\mu_A, \Sigma_A)$, and a probability density function indicating a corresponding probability density distribution may be given as below.

$$f_{x_A}(x) = \frac{1}{2\pi\sqrt{|\Sigma_A|}}\exp\left(-\frac{1}{2}(x-\mu_A)^T \Sigma_A^{-1}(x-\mu_A)\right) \quad \text{[Equation 6]}$$

Herein, an equation of an oval including a contour where a probability density function value is constant may be defined as $(x-\mu_A)^T \Sigma_A^{-1}(x-\mu_A)=K$ by using Equation 5, and K may be given as Equation 7.

$$K = -2\ln(1-p) \quad \text{[Equation 7]}$$

Herein, p indicates a probability of being less than the Mahalanobis distance between the point x on the oval and the probability density distribution, in which the size of the oval may be determined by the Mahalanobis distance, such that the size of the oval may be determined also by p.

Meanwhile, when an Eigen value of $\Sigma A$ is given by $\lambda_A^{(1)}$ and $\lambda_A^{(2)}$ ($\lambda_A^{(1)} \geq \lambda_A^{(2)}$), the semi major radius and the semi minor radius of the oval may be expressed as Equation 8 and Equation 9, respectively.

$$r_{major}^A(p) = \sqrt{-2\lambda_A^{(1)}\ln(1-p)} \quad \text{[Equation 8]}$$

$$r_{minor}^A(p) = \sqrt{-2\lambda_A^{(2)}\ln(1-p)} \quad \text{[Equation 9]}$$

Let the central coordinates of the region be $\mu_1$, the radius in meters of the region be $r_1$, and radiuses corresponding to a longitude and a latitude be $\Delta_{I,lon}$ and $\Delta_{I,lat}$, respectively, then an equation of an oval corresponding to the region may be given using Equation 5 as below.

$$(x-\mu_1)^T \Sigma_1^{-1}(x-\mu_1) = -2\ln(1-p) \quad \text{[Equation 10]}$$

Herein, the covariance matrix is $$\sum_1 = \text{diag}\left(\frac{-\Delta_{l,lon}^2}{2\ln(1-p)}, \frac{-\Delta_{l,lat}^2}{2\ln(1-p)}\right).$$

Thus, a virtual probability density distribution corresponding to the region may be defined as $x_1 \sim N(\mu_1, \Sigma_1)$.

The processor 360 may generate probability density distributions corresponding to the position estimation region and the region of interest.

The processor 360 may obtain a correlation between the generated probability density distribution for the position estimation region and the generated probability density distribution for the region of interest. For example, the processor 360 may generate a probability density distribution for a coupling region between the probability density distribution for the position estimation region and the probability density distribution for the region of interest.

Figure 5:
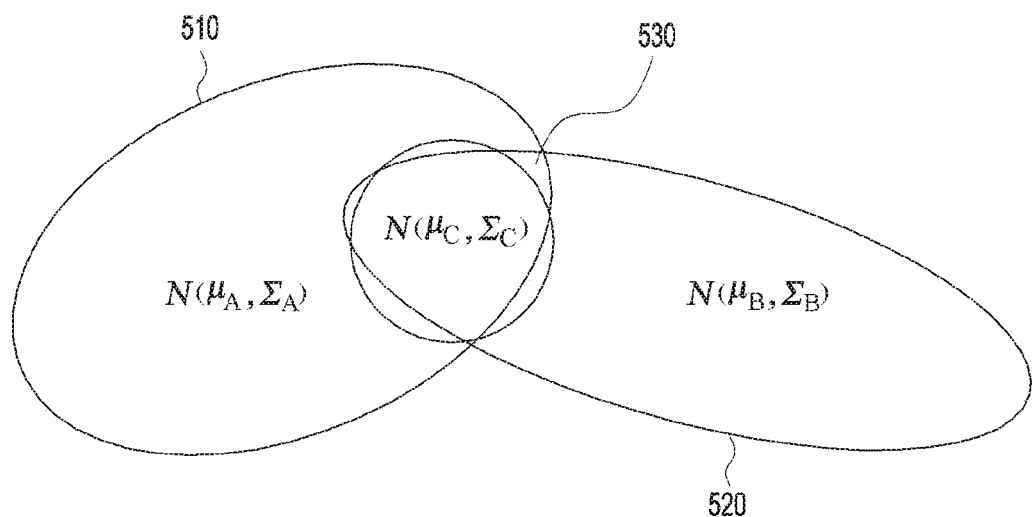
FIG. 5 is a view for mutual relation among probability density distributions for a region of interest, a position estimation region, and a coupling region, according to various embodiments of the present disclosure.

FIG. 5 is a view for mutual relation among probability density distributions for a region of interest, a position estimation region, and a coupling region, according to various embodiments of the present disclosure.

Referring to FIG. 5, an overlapping region between a probability density distribution 510 for the position estimation region and a probability density distribution 520 for the region of interest may be defined as the coupling region, and the processor 360 may generate a probability density distribution 530 for the coupling region.

The probability density distribution 530 for the coupling region may be mathematically expressed as below.

For example, when two probability density distributions $x_A \sim N(\mu_A, \Sigma_A)$ and $x_B \sim N(\mu_B, \Sigma_B)$ are given, a coupling distribution $x_C \sim N(\mu_C, \Sigma_C)$ between the two probability density distributions may be obtained as below.

$$\mu_C = (\Sigma_A^{-1} + \Sigma_B^{-1})^{-1}(\Sigma_A^{-1}\mu_A + \Sigma_B^{-1}\mu_B) \quad \text{[Equation 11]}$$

$$\Sigma_C = (\Sigma_A^{-1} + \Sigma_B^{-1})^{-1} \quad \text{[Equation 12]}$$

For example, an oval indicating an overlapping region between an oval indicating $x_A$ and an oval $x_B$ as physical meanings is an oval indicating a coupling region $x_C$, and a probability density distribution corresponding to $x_C$ is a probability density distribution for the coupling region.

The processor 360 may calculate a distance (hereinafter, a first distance) between the probability density distribution 510 for the position estimation region and the generated probability density distribution 530 for the coupling region. For example, the first distance means a distance between the probability density distributions 510 and 530 of the position estimation region and the coupling region, and may be indicated using a distance between the central coordinates of the two regions and a shape similarity between the probability density distributions 510 and 530 of the two regions. According to an embodiment of the present disclosure, the first distance may be calculated based on a Bhattacharyya distance.

The processor 360 may calculate a second distance by applying a weight value to a second preliminary distance between the probability density distribution 520 for the region of interest and the generated probability density distribution 530 for the coupling region. For example, the calculated second preliminary distance means the distance between the probability density distributions 520 and 530 of the region of interest and the coupling region, and may be indicated using a distance between the central coordinates of the two regions and a shape similarity between the probability density distributions 520 and 530 of the two regions.

According to an embodiment of the present disclosure, the second preliminary distance may be calculated based on the Bhattacharyya distance. The processor 360 may finally calculate a second distance as the distance between the probability density distributions 520 and 530 for the region of interest and the coupling region by applying a weight value to the calculated second preliminary distance. For example, the calculated weight value may be set to a value for improving a correlation between the probability density distribution 510 for the position estimation region and the probability density distribution 520 for the region of interest. The second distance has opposite characteristics to the correlation, such that the weight value may be set to a value that causes the second preliminary distance to decrease.

A distance between two probability density distributions may be expressed as an equation as below.

When the two probability density distributions are given as $x_A \sim N(\mu_A, \Sigma_A)$ and $x_B \sim N(\mu_B, \Sigma_B)$, a distance $d(A,B)$ between the two distributions may be calculated based on the Bhattacharyya distance as below.

$$d(A, B) = \frac{1}{8}(\mu_A - \mu_B)^T \Sigma^{-1}(\mu_A - \mu_B) + \frac{1}{2}\ln\left(\frac{|\Sigma|}{\sqrt{|\Sigma_A||\Sigma_B|}}\right) \quad \text{[Equation 13]}$$

Herein, $$\sum = \frac{\sum_A + \sum_B}{2}.$$

For example, to simplify calculation of $d(A,B)$, a covariance matrix of the two probability density distributions may be made into a diagonal matrix as Equation 14 and Equation 15.

$$\tilde{\sum_A} \equiv \text{diag}\left(\sum_A\right) = \begin{bmatrix} \sum_A(1,1) & 0 \\ 0 & \sum_A(2,2) \end{bmatrix} \quad \text{[Equation 14]}$$

$$\tilde{\sum_B} \equiv \text{diag}\left(\sum_B\right) = \begin{bmatrix} \sum_B(1,1) & 0 \\ 0 & \sum_B(2,2) \end{bmatrix} \quad \text{[Equation 15]}$$

Substituting Equation 14 and Equation 15 into Equation 13, a distance $d(A,B)$ between the two distributions may be expressed as Equation 16.

$$d(A, B) \approx \quad \text{[Equation 16]}$$

$$\frac{1}{8}(\mu_A - \mu_B)^T \tilde{\sum}^{-1}(\mu_A - \mu_B) + \frac{1}{2}\ln\left(\frac{|\tilde{\sum}|}{\sqrt{|\tilde{\sum}_A||\tilde{\sum}_B|}}\right) =$$

-continued $$\frac{1}{8}(\mu_A - \mu_B)^T \begin{bmatrix} \frac{1}{\tilde{\Sigma}(1,1)} & 0 \\ 0 & \frac{1}{\tilde{\Sigma}(2,2)} \end{bmatrix}(\mu_A - \mu_B) +$$

$$\frac{1}{2}\ln\left(\frac{\left(\tilde{\Sigma}(1,1)\tilde{\Sigma}(2,2)\right)}{\sqrt{\tilde{\Sigma}_A(1,1)\tilde{\Sigma}_A(2,2)\tilde{\Sigma}_B(1,1)\tilde{\Sigma}_B(2,2)}}\right)$$

Herein, $$\tilde{\Sigma} = \frac{\tilde{\Sigma}_A + \tilde{\Sigma}_B}{2}.$$

The processor 360 may derive a correlation based on the calculated first distance and the calculated second distance. For example, the processor 360 may calculate a final distance between the probability density distribution 510 for the position estimation region and the probability density distribution 520 for the region of interest by summing the calculated first distance with the calculated second distance. The processor 360 may derive a correlation by converting the final distance between the probability density distribution 510 for the position estimation region and the probability density distribution 520 for the region of interest into a value between 0 and 1.

According to an embodiment of the present disclosure, a correlation (c) may be calculated using a log function based on the final distance, such as Equation 17.

$$c = \exp(-d) \quad \text{[Equation 17]}$$

In the present disclosure, a method for deriving the correlation is not limited thereto, and may be derived in various ways.

Figure 6:
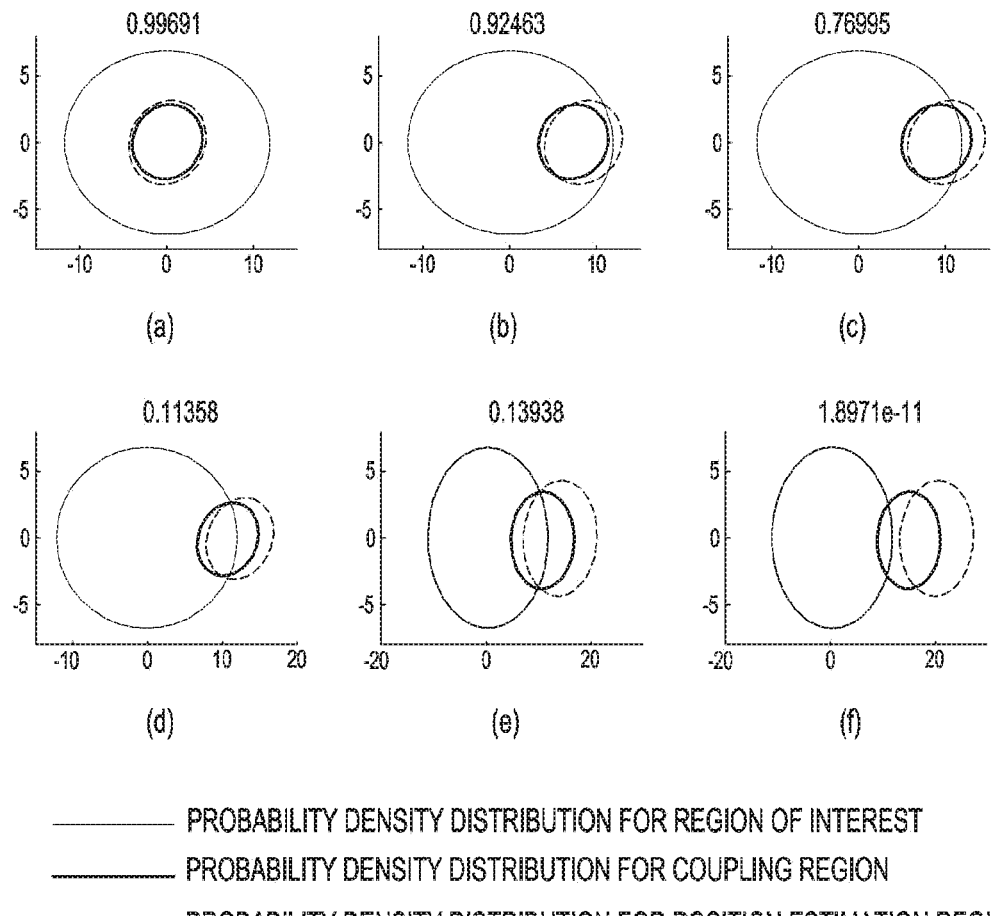
FIG. 6 is a view for correlations among probability density distributions for a region of interest, a position estimation region, and a coupling region, according to various embodiments of the present disclosure.

FIG. 6 is a view for correlations among probability density distributions for a region of interest, a position estimation region, and a coupling region, according to various embodiments of the present disclosure. In FIGS. 6(a) through 6(f), a relatively thin solid line indicates a probability density distribution for a region of interest, a dotted line indicates a probability density distribution for a position estimation region, and a relatively thick solid line indicates a probability density distribution for a coupling region between the region of interest and the position estimation region, in which a number in an upper portion of each figure indicates a correlation between the region of interest and the position estimation region.

Referring to FIGS. 6(a) through 6(f), as a probability density distribution for the region of interest and a probability density distribution for the position estimation region move away from each other and a corresponding correlation also decreases, in a direction from FIGS. 6(a) to 6(f). As the distance between the two probability density distributions becomes longer, that is, an overlapping region becomes smaller, the correlation becomes lower, which may mean a lower probability of the electronic device entering the region of interest.

In FIGS. 6(a) and 6(b), the probability density distribution for the position estimation region is included in the probability density distribution for the region of interest, and the correlation is almost close to 1. In particular, when compared to FIGS. 6(a) and (b), the correlation is higher in FIG. 6(a) than in FIG. 6(b). This may mean that as an interval between the two probability density distributions is closer to the central coordinates, the correlation becomes higher. That is, as the correlation becomes higher, a probability of the electronic device entering the region of interest becomes higher.

According to various embodiments of the present disclosure, the electronic device (e.g., the electronic device 301) may include a communication circuit (e.g., the wireless communication circuit 310) configured to communicate with at least one network and a processor (e.g., the processor 360) configured to obtain a position estimation region of the electronic device 301 based on the at least one network via the communication circuit 31 and to determine the electronic device 301 has entered the region of interest based on a correlation between a probability distribution for the obtained position estimation region and a probability distribution for a preset region of interest.

According to various embodiments of the present disclosure, the processor 360 may be further configured to generate a probability distribution for a coupling region in a point of a distance between the probability distribution for the obtained position estimation region and the probability distribution for the preset region of interest, to calculate a first distance between the probability distribution for the obtained position estimation region and the generated probability distribution for the coupling region, to calculate a second distance by applying a weight value to a distance between the probability distribution for the preset region of interest and the generated probability distribution for the coupling region, to derive the correlation based on the calculated first distance and the calculated second distance.

According to various embodiments of the present disclosure, the communication circuit 310 may include a first communication circuit (e.g., the first wireless communication circuit 311) configured to communicate with a first network among the at least one network and a second communication circuit (e.g., the second wireless communication circuit 315) configured to communicate with a second network among the at least one network.

According to various embodiments of the present disclosure, the first wireless network may include a cellular-based network, and the second wireless network may include a WLAN-based network.

According to various embodiments of the present disclosure, the processor 360 may be further configured to determine whether the electronic device 301 has entered the preset region of interest, based on a second correlation obtained based on the second network, when a first correlation obtained based on the first network is a value between a first threshold value and a second threshold value.

According to various embodiments of the present disclosure, the processor 360 may be further configured to determine that the electronic device 301 has entered the preset region of interest when the first correlation is greater than or equal to the first threshold value, and to determine that the electronic device 301 has not entered the preset region of interest when the first correlation is less than or equal to the second threshold value.

According to various embodiments of the present disclosure, the processor 360 may be further configured to determine that the electronic device 301 has entered the preset region of interest when the second correlation is greater than or equal to the first threshold value and to determine that the electronic device 301 has not entered the preset region of interest when the second correlation is less than or equal to the second threshold value.

According to various embodiments of the present disclosure, the processor 360 may be further configured to update the second correlation based on the second network after a preset delay time when the second correlation is a value between the first threshold value and the second threshold value.

According to various embodiments of the present disclosure, the processor 360 may be further configured to perform a preset action based on a result of determination of whether the electronic device 301 has entered the preset region of interest.

According to various embodiments of the present disclosure, the preset action may include a notification service operation indicating entry or leaving of the electronic device to or from the preset region of interest.

According to various embodiments of the present disclosure, an electronic device (e.g., the electronic device 301) may include a communication circuit (e.g., the wireless communication circuit 310) configured to communicate with a plurality of networks and a processor (e.g., the processor 360) configured to obtain a first position estimation region of the electronic device 301 based on a first network among the plurality of networks via the communication circuit 310, to determine whether the electronic device 301 has entered a preset region of interest, based on the obtained first position estimation region, to obtain a second position estimation region of the electronic device 301 based on a second network among the plurality of networks via the communication circuit 310 when a result of the determination based on the first position estimation region does not satisfy a preset condition, and to determine whether the electronic device 301 has entered the preset region of interest, based on the obtained second position estimation region.

An operation of the processor 360 will be described in more detail with reference to FIGS. 7 through 12.

Figure 7:
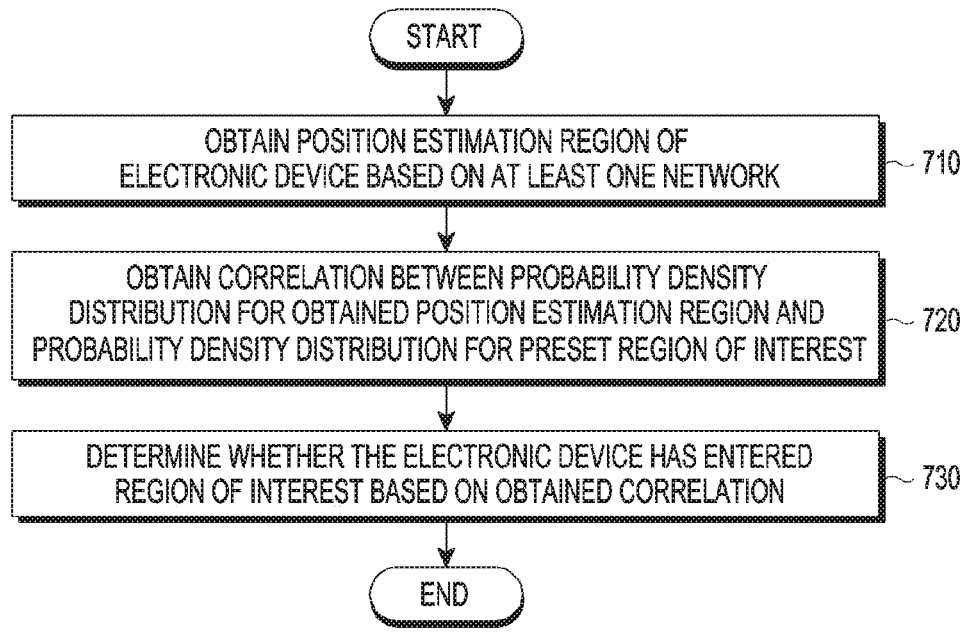
FIG. 7 is a flowchart illustrating a method for determining whether an electronic device has entered a region of interest, according to various embodiments.

FIG. 7 is a flowchart illustrating a method for determining an electronic device has entered a region of interest, according to various embodiments. The method may include operations 710 through 730. The method for identifying the entry of the electronic device to the region of interest may be performed by any one of the electronic device (e.g., the electronic device 301) or the processor (e.g., the processor 120 or the processor 360) of the electronic device.

In operation 710, the electronic device may obtain a position estimation region of the electronic device based on at least one wireless network. For example, the electronic device may estimate a region where the electronic device is located, based on wireless network information received via at least one wireless network.

According to an embodiment of the present disclosure, the electronic device may estimate a region where the electronic device is located, based on first wireless network information received via a first wireless network. For example, the first wireless network may include a cellular-based network. The electronic device may receive cellular-based data from at least one base station (or a cell) via the cellular-based network, and estimate the region where the electronic device is located, based on the received cellular-based data.

According to an embodiment of the present disclosure, the electronic device may estimate a region where the electronic device is located, based on second wireless network information received via a second wireless network. For example, the second wireless network may include a WLAN-based network. The electronic device may receive WLAN-based data from at least one AP to which the electronic device is accessing via the WLAN, and estimate the region where the electronic device is located, based on the received WLAN-based data.

In operation 720, the electronic device may obtain a correlation between a probability density distribution for the obtained position estimation region and a probability density distribution for a preset region of interest. For example, the electronic device may generate a probability density distribution corresponding to the obtained position estimation region of the electronic device. The electronic device may also generate a probability density distribution corresponding to the preset region of interest. The electronic device may calculate a correlation indicating the degree of overlapping between the generated probability density distribution for the position estimation region and the probability density distribution for the preset region of interest to correspond to a distance between the two probability density distributions. A distance between the position estimation region and the region of interest or a region between the probability density distributions for the regions may be inversely proportional to the correlation. That is, as the distance between the probability density distributions for the position estimation region and the region of interest becomes longer, the correlation decreases; the distance between the probability density distributions becomes shorter, the correlation may increase.

In operation 730, for example, the electronic device may identify the entry of the electronic device to the region of interest based on the obtained correlation.

According to an embodiment of the present disclosure, the electronic device may identify the entry of the electronic device to the region of interest based on the correlation obtained via a wireless network. For example, the electronic device may determine that the electronic device has entered the region of interest when the obtained correlation is greater than or equal to a designated threshold value, and may determine that the electronic device has not entered the region of interest when the correlation is less than the threshold value.

According to an embodiment of the present disclosure, the electronic device may identify the entry of the electronic device to the region of interest based on correlations obtained via at least two heterogeneous wireless networks. For example, the electronic device may identify the entry of the electronic device to the region of interest based on correlations obtained via heterogeneous wireless networks having different position estimation precisions of the electronic device. For example, the electronic device may determine that the electronic device has entered the region of interest when a first correlation obtained via the first wireless network is greater than or equal to the first threshold value, and may determine that the electronic device has not entered the region of interest when the obtained first correlation is less than the second threshold value. In a case where the obtained first correlation is between the first threshold value and the second threshold value, the electronic device may obtain the second correlation via the second wireless network.

The electronic device may determine that the electronic device has entered the region of interest when the obtained second correlation is greater than or equal to the third threshold value, and may determine that the electronic device has not entered the region of interest when the obtained second correlation is less than the third threshold value. In a case where the obtained second correlation is less than the third threshold value, the electronic device may re-obtain a correlation via the wireless network after a designated delay time and update the correlation. The electronic device may re-determine the entry of the electronic device to the region of interest by using the updated correlation in the same manner as described above.

Figure 8:
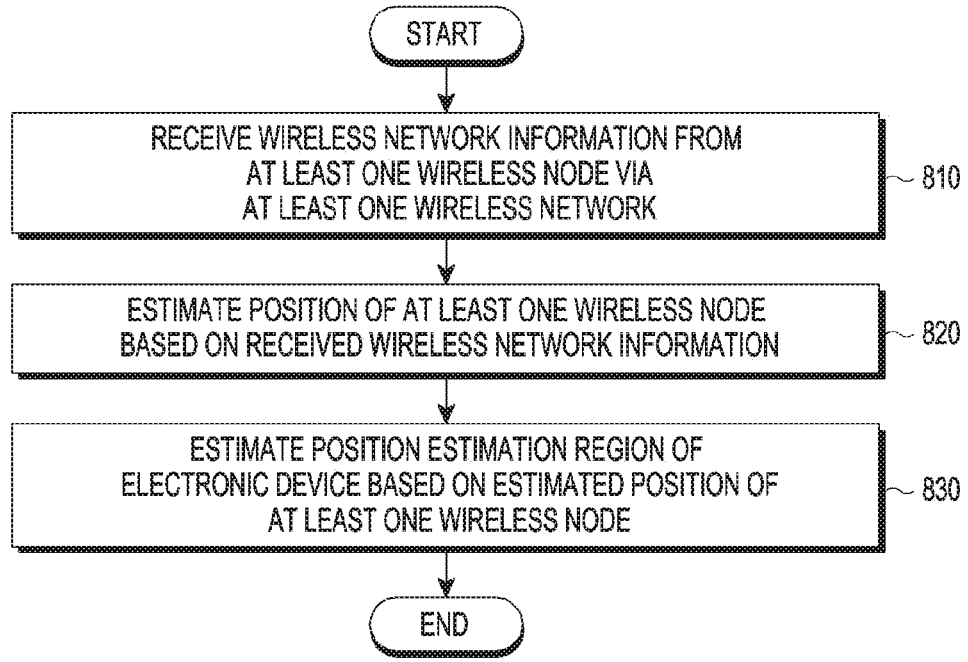
FIG. 8 is a flowchart illustrating a method for determining whether an electronic device has entered a region of interest, according to various embodiments.

FIG. 8 is a flowchart illustrating a method for determining whether electronic device has entered a region of interest, according to various embodiments. FIG. 8 is a flowchart illustrating in detail a method for obtaining a position estimation region in operation 710 illustrated in FIG. 7, in which the method may include operations 810 through 830. The method may be performed by any one of the electronic device (e.g., the electronic device 301) or the processor (e.g., the processor 120 or the processor 360) of the electronic device.

In operation 810, for example, the electronic device may receive wireless network information from at least one wireless node via at least one wireless network.

According to an embodiment of the present disclosure, the electronic device may receive the first wireless network information via the first wireless network. For example, the first wireless network may include a cellular-based network, and the electronic device may receive cellular-based data from at least one base station or cell via the cellular-based network. For example, the cellular-based data may include base station information (or cell information), and the base station information may include cell (e.g., serving cell) information regarding a base station to which the electronic device is accessing and cell (e.g., neighbor cell) information regarding at least one neighbor base station located adjacent to the base station.

The serving cell information may include, for example, network information, identification information, and measurement information. The network information may include at least one of an MCC, an MNC, a RAT, a TAC, or a combination thereof. The identification information may include at least one of a GCI, a PCI, an EARFCN, or a combination thereof. The measurement information may include at least one of an RSSI, an RSRQ, an SNR, an RSRP, a TA, or a combination thereof. The neighbor cell information may include identification information and measurement information, in which the identification information may include at least one of a PCI, an EARFCN, or a combination thereof. The measurement information may include an RSRP.

According to an embodiment of the present disclosure, the electronic device may receive the second wireless network information via the second wireless network. For example, the second wireless network may include a WLAN, and the electronic device may receive WLAN-based data from at least one AP to which the electronic device is accessing via the WLAN-based network. For example, the WLAN-based data may include at least a part of identification information (e.g., a MAC address, an IP address, or a UUID), geographical location information (e.g., latitude-longitude coordinates), and administrative location information (e.g., city/district/province information) of a wireless LAN AP to which the electronic device is accessing, hotspot information indicating an area where the wireless LAN AP is installed and thus communication is possible, measurement information (e.g., an RSSI), or a combination thereof.

In operation 820, the electronic device may estimate a position of the at least one wireless node based on the received wireless network information.

According to an embodiment of the present disclosure, the electronic device may estimate positions of a plurality of base stations (or cells), based on the first wireless network information received via the first wireless network. For example, the electronic device may estimate the positions of the plurality of base stations (or cells) by calculating a distance between the electronic device and the plurality of base stations (or cells) based on measurement information (e.g., an RSSI, an SNR, an RSRP, a TA, or a combination thereof) received from the plurality of base stations (or cells). The electronic device may estimate the positions of the plurality of base stations (or cells) by calculating coverages or regions of the plurality of base stations (or cells) based on at least a part of the network information, the identification information, or the measurement information received from the plurality of base stations (or cells). The electronic device may receive and download the positions of the plurality of base stations (or cells) or the coverages or regions of the plurality of base stations (cells) corresponding to the position where the electronic device is located, through a server related to estimation of the position of the electronic device.

According to an embodiment of the present disclosure, the electronic device may estimate a position of at least one WLAN AP, based on the second wireless network information received via the second wireless network. For example, the electronic device may measure the position of the at least one WLAN AP based on measurement information (e.g., an RSSI) received from the at least one AP. The electronic device may estimate the position of the at least one WLAN AP based on at least a part of identification information, geographical position information, administrative position information, or hotspot information of a hotspot where the WLAN AP is installed, received from the at least one WLAN AP.

In the current embodiment, the method for estimating the position of the at least one wireless node is not limited to the above-described method, and it would be understood by those of ordinary skill in the art that a position, a region, or a coverage of the at least one wireless node may be estimated in various ways based on the received wireless network information.

In operation 830, the electronic device may estimate a position estimation region of the electronic device based on the estimated position of the at least one wireless node. For example, the electronic device may estimate a coverage or region of the one wireless node identified based on the received wireless network information as a region where the electronic device is located. The electronic device may estimate an overlapping coverage or region between coverages or regions of the plurality of wireless nodes, which are identified based on the received wireless network information, as the region where the electronic device is located.

According to an embodiment of the present disclosure, the electronic device may estimate a region where the electronic device is located, based on first wireless network information received via a first wireless network. For example, the electronic device may estimate as the position estimation region of the electronic device, an overlapping region between the positions of the plurality of wireless base stations (or cells) estimated based on the cellular-based data received from the plurality of wireless base stations (or cells) and the coverages of the plurality of wireless base stations (or cells).

According to an embodiment of the present disclosure, the electronic device may estimate a region where the electronic device is located, based on second wireless network information received via a second wireless network. For example, the electronic device may estimate as the position estimation region of the electronic device, a coverage or a region corresponding to the at least one WLAN AP in a position estimated based on WLAN-based data received from the at least one WLAN AP.

The position estimation region of the electronic device obtained based on the first wireless network may include a coverage or a region that is larger than the position estimation region of the electronic device obtained based on the second wireless network. That is, the position estimation region of the electronic device obtained based on the second wireless network may have a higher precision than that of the position estimation region of the electronic device obtained based on the first wireless network, such that a precision of determination of entry of the electronic device to the region of interest may be higher in the position estimation region based on the second wireless network than in the position estimation region based on the first wireless network.

In the current embodiment, the position estimation region of the electronic device is not limited to the above-described method, and it would be understood by those of ordinary skill in the art that the position estimation region of the electronic device may be obtained in various ways based on the received wireless network information.

Figure 9:
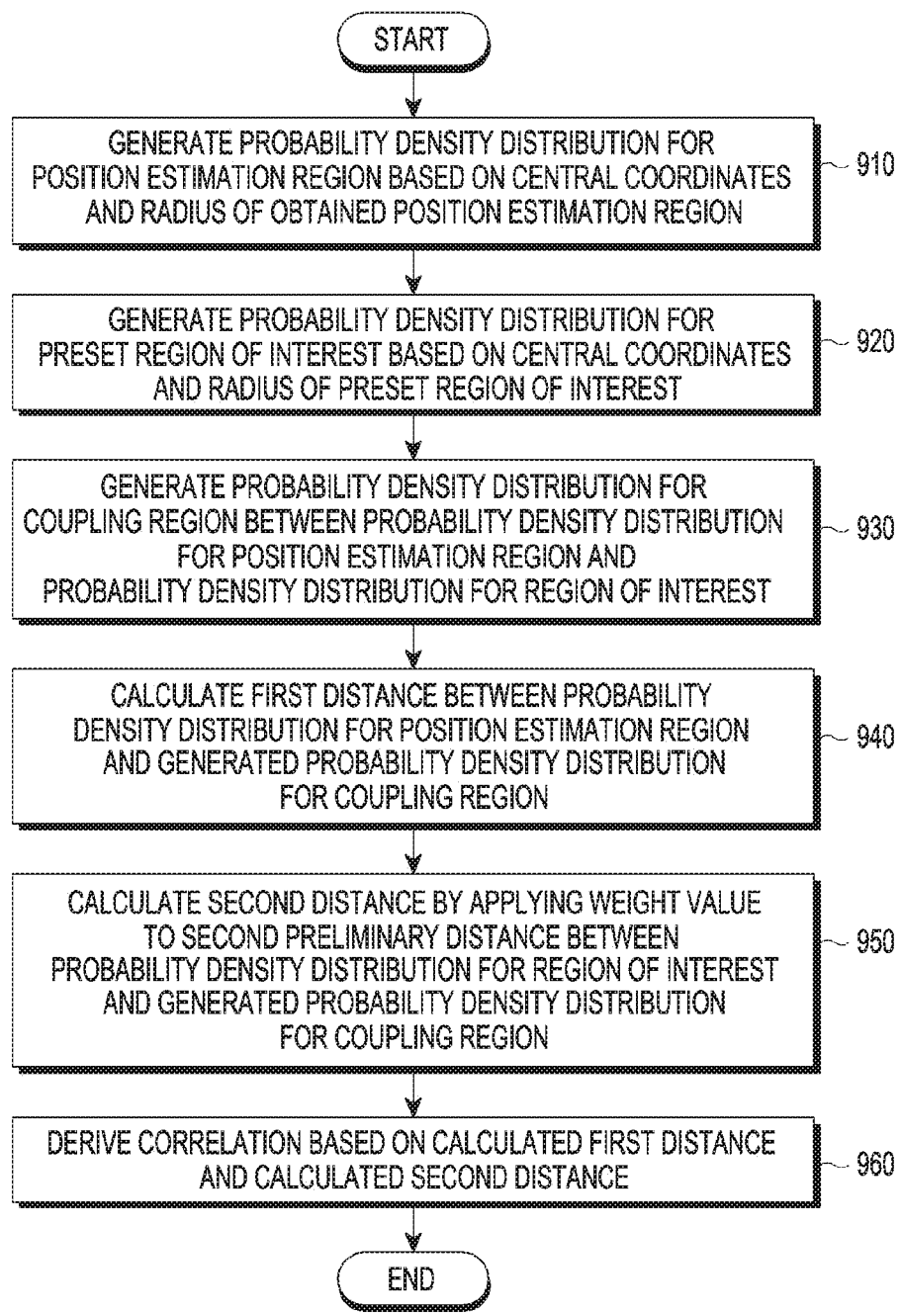
FIG. 9 is a flowchart illustrating a method for determining whether an electronic device has entered a region of interest, according to various embodiments.

FIG. 9 is a flowchart illustrating a method for determining whether an electronic device has entered a region of interest, according to various embodiments. FIG. 9 is a flowchart illustrating in detail a method for obtaining a correlation in operation 720 illustrated in FIG. 7, in which the method may include operations 910 through 960. The method may be performed by any one of the electronic device (e.g., the electronic device 301) or the processor (e.g., the processor 120 or the processor 360) of the electronic device.

In operation 910, the electronic device may generate a probability density distribution for the position estimation region based on central coordinates and radius of the position estimation region obtained based on at least one wireless network. For example, the obtained position estimation region is assumed to have a circular shape.

According to an embodiment of the present disclosure, the electronic device may obtain central coordinates and radius from the obtained position estimation region. The electronic device may transform a latitude-longitude coordinate system based on the obtained central coordinate and radius and calculate a semi major radius and a semi minor radius corresponding to the latitude-longitude coordinate system. The position estimation region transformed into the latitude-longitude coordinate system may be transformed into an oval shape because a latitude length and a longitude length corresponding to the same distance in meters are different from each other. The electronic device may normalize the position estimation region based on the calculated semi major radius and semi minor radius and transform the position estimation region into a probability density distribution. For example, the normalization may include a 2D normal distribution.

In operation 920, the electronic device may generate a probability density distribution for a preset region of interest based on central coordinates and radius of the preset region of interest. For example, the preset region of interest is assumed to have a circular shape.

According to an embodiment of the present disclosure, the electronic device may obtain central coordinates and radius from the preset region of interest. The electronic device may transform a latitude-longitude coordinate system based on the obtained central coordinate and radius and calculate a semi major radius and a semi minor radius corresponding to the latitude-longitude coordinate system. The region of interest transformed into the latitude-longitude coordinate system may be transformed into an oval shape because a latitude length and a longitude length corresponding to the same distance in meters are different from each other. The electronic device may normalize the region of interest based on the calculated semi major radius and semi minor radius and transform the position estimation region into a probability density distribution. For example, the normalization may include a 2D normal distribution.

In operation 930, the electronic device may generate a probability density distribution for a coupling region between the probability density distribution for the position estimation region and the probability density distribution for the region of interest. For example, the electronic device may perform normalization based on a semi major radius and a semi minor radius for the coupling region to generate a coupling probability density distribution. The generated probability density distribution for the coupling region may be expressed with central coordinates of the coupling region and a covariance matrix. The covariance matrix may indicate a form of the probability density distribution in the coupling region.

In operation 940, the electronic device may calculate a distance (e.g., the first distance) between a probability density distribution for the position estimation region and the generated probability density distribution for the coupling region. For example, the first distance means a distance between the probability density distributions for the position estimation region and the coupling region, and may be indicated using a distance between the central coordinates of the two regions and a shape similarity between the probability density distributions for the two regions. According to an embodiment of the present disclosure, the first distance may be calculated based on a Bhattacharyya distance.

In operation 950, the electronic device may calculate a second distance by applying a weight value to the second preliminary distance between the probability density distribution for the region of interest and the generated probability density distribution for the coupling region. For example, the calculated second preliminary distance means a distance between the probability density distributions for the position estimation region and the coupling region, and may be indicated using a distance between the central coordinates of the two regions and a shape similarity between the probability density distributions for the two regions.

According to an embodiment of the present disclosure, the second preliminary distance may be calculated based on the Bhattacharyya distance. The electronic device may finally calculate the second distance as the distance between the probability density distributions for the region of interest and the coupling region by applying the weight value to the calculated second preliminary distance. For example, the calculated weight value may be set to a value for improving a correlation between a probability density distribution for the position estimation region and a probability density distribution for the region of interest. For example, the second distance has opposite characteristics to the correlation, such that the weight value may be set to a value that causes the second preliminary distance to decrease.

In operation 960, the electronic device may derive a correlation based on the calculated first distance and the calculated second distance. For example, the electronic device may calculate a final distance between the probability density distribution for the position estimation region and the probability density distribution for the region of interest by summing the calculated first distance with the calculated second distance. The electronic device may derive a correlation by converting the calculated final distance between the probability density distribution for the position estimation region and the probability density distribution for the region of interest into a value between 0 and 1.

According to an embodiment of the present disclosure, the correlation may be calculated using a log function based on the final distance. The method for deriving the correlation is not limited thereto, and may be derived in various ways.

Figure 10:
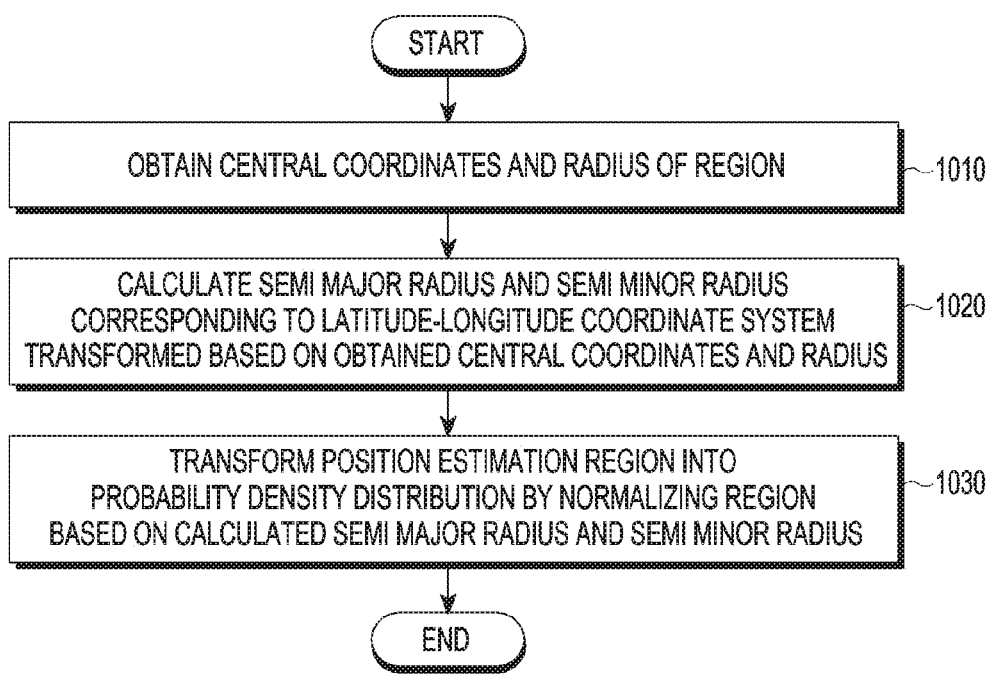
FIG. 10 is a flowchart illustrating a method for determining whether an electronic device has entered a region of interest, according to various embodiments.

FIG. 10 is a flowchart illustrating a method for determining whether an electronic device has entered a region of interest, according to various embodiments. FIG. 10 is a flowchart illustrating in detail a method for generating a probability density distribution for a region such as a position estimation region, a region of interest, or a coupling region in operations 910 through 930 illustrated in FIG. 9, in which the method may include operations 1010 through 1030. The method may be performed by any one of the electronic device (e.g., the electronic device 301) or the processor (e.g., the processor 120 or the processor 360) of the electronic device. In the current embodiment, the region is assumed to have a circular shape.

In operation 1010, for example, the electronic device may obtain central coordinates and radius of a region. The central coordinates and radius of the region may be input from the user of the electronic device. For example, in a case where the region is a region of interest, the user may input and register central coordinates and radius of the region of interest via an input device of the electronic device. The electronic device may identify the central coordinates and radius of the region of interest, which are input in registration of the region of interest. In a case where the central coordinates and radius of the region are input, at least one of the central coordinates or radius may be previously designated.

For example, in a case where the radius of the region of interest is previously designated in registration of the region of interest, when the user touches a point to be registered as the region of interest on the display of the electronic device, the region of interest may be automatically formed with the preset radius with respect to the touched point.

In a case where the central coordinates of the region of interest are previously designated in registration of the region of interest, the user may select a selection box or an option box for selecting one of a plurality of radiuses with respect to the designated central coordinates displayed on the display of the electronic device or directly input a radius to an input field displayed on the display of the electronic device, such that the region of interest with the selected or directly input radius with respect to the designated central coordinates may be automatically formed.

When the electronic device performs the application related to registration of the region of interest, the specific map may be displayed on the display of the electronic device. As the user adjusts an interval between two touched positions by swiping to narrow or widen the interval on the specific map displayed on the display of the electronic device, a position (e.g., central coordinates) in which and a size (e.g., a radius) by which the region of interest is to be registered may be input. That is, the electronic device may detect a central position of the input region as the central coordinates of the region of interest and a size, i.e., a radius, of the input region as the radius of the region of interest and register the region of interest.

Likewise, when the region is the obtained or generated position estimation region or coupling region, central coordinates and radius of the region may be calculated based on a position and a size of the obtained or generated region.

In operation 1020, the electronic device may calculate central coordinates, semi major radius, and semi minor radius corresponding to a latitude-longitude coordinate system transformed based on the obtained central coordinates $\mu_1$ and radius $r_1$ of the region. For example, the electronic device may transform the region into the latitude-longitude coordinate system on the surface by using the obtained central coordinates and radius of the region. When being transformed into the latitude-longitude coordinate system on the surface, the central coordinates may have latitude-longitude coordinate values having a latitude along the horizontal axis and a longitude along the vertical axis, and the region may be transformed into an oval shape because a latitude length and a longitude length corresponding to the same distance in meters are different from each other. When transforming the central coordinates into the latitude-longitude coordinate system, the electronic device may calculate semi major radius and semi minor radius of the region in the oval shape based on latitude-longitude coordinate values of the transformed central coordinates and the radius. For example, the electronic device may calculate a distance corresponding to the radius along the horizontal axis with respect to the latitude coordinate value of the central coordinates as a semi major radius of the region. The electronic devices may calculate a distance corresponding to the radius along the vertical axis with respect to the longitude coordinate value of the central coordinates as a semi minor radius of the region. The calculated semi major radius and semi minor radius are not limited to the foregoing example, and the semi major radius may be a semi major radius calculated corresponding to the radius with respect to the longitude coordinate value and the semi minor radius may be a semi minor radius calculated corresponding to the radius $r_1$ with respect to the latitude coordinate value.

In operation 1030, for example, the electronic device may transform the position estimation region into a probability density distribution by normalizing the region based on the calculated semi major radius and semi minor radius. For example, the electronic device may transform the region into a probability density distribution by normalizing the region into a normal distribution by using the calculated semi major radius and semi minor radius and the central coordinates of the region.

According to an embodiment of the present disclosure, the normal distribution used in normalization may include a 2D normal distribution.

Figure 11:
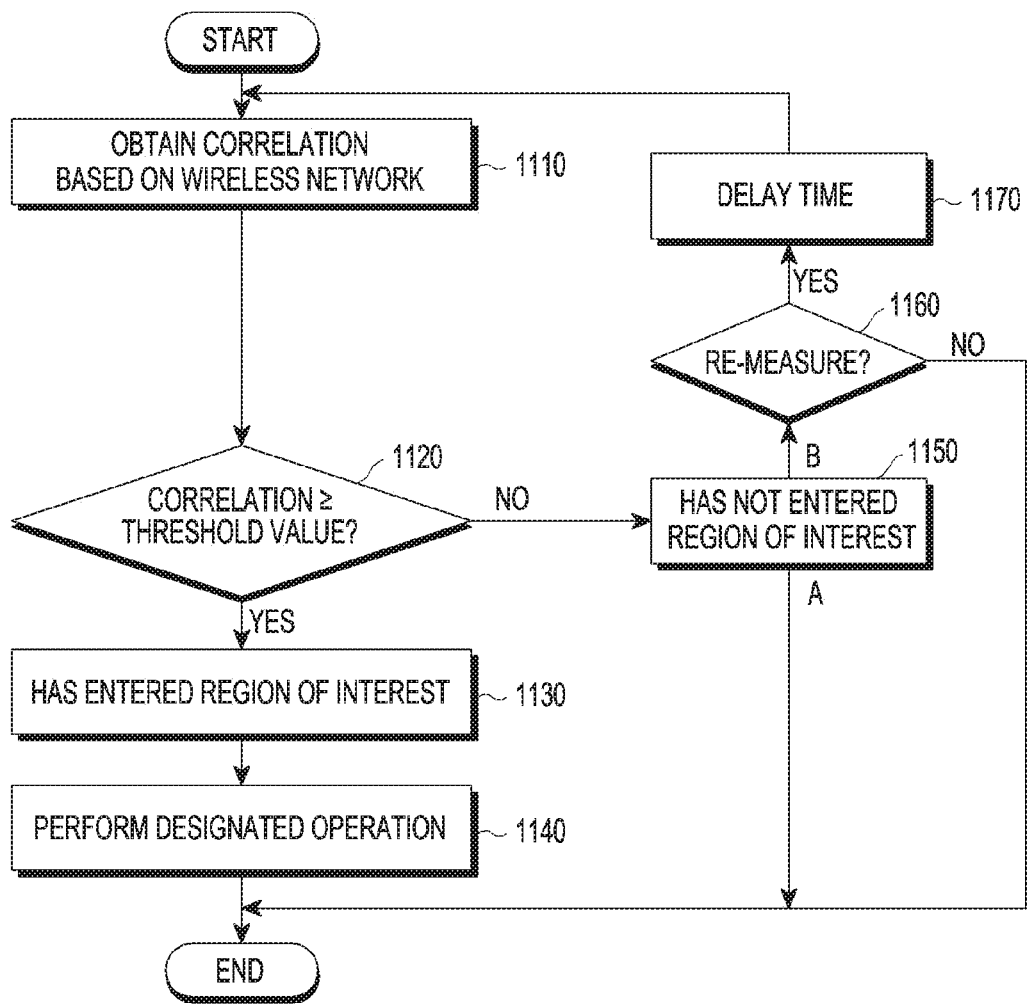
FIG. 11 is a flowchart illustrating a method for determining whether an electronic device has entered a region of interest, according to various embodiments.

FIG. 11 is a flowchart illustrating a method for determining whether an electronic device has entered a region of interest, according to various embodiments. FIG. 11 is a flowchart illustrating in more detail a method for identifying the entry to a region of interest in operation 730 illustrated in FIG. 7, in which the method may include operations 1110 through 1170. The method may be performed by any one of the electronic device (e.g., the electronic device 301) or the processor (e.g., the processor 120 or the processor 360) of the electronic device.

In operation 1110, the electronic device may obtain a correlation between a probability density distribution for the position estimation region and a probability density distribution for the region of interest, based on any one of a plurality of wireless networks.

According to an embodiment of the present disclosure, any one of the plurality of wireless networks may be the first wireless network or the second wireless network, in which the first wireless network may include a cellular-based network, and the second wireless network may include a WLAN-based network.

According to an embodiment of the present disclosure, the obtained correlation may have a value between 0 and 1. As the correlation is closer to 1, the distance between the probability density distribution for the position estimation region and the probability density distribution for the region of interest may be short, which may mean that the position estimation region of the electronic device is close to the region of interest. That is, as the correlation is closer to 1, there is a high probability that the electronic device has entered the region of interest; as the correlation is closer to 0, there is a low probability that the electronic device has entered the region of interest.

In operation 1120, for example, the electronic device may determine whether the correlation is greater than or equal to a threshold value. In operation 1120, when the correlation is greater than or equal to the threshold, the electronic device may perform operation 1130, when the correlation is less than the threshold, the electronic device may perform operation 1150.

In operation 1130, for example, the electronic device may determine that the electronic device has entered the region of interest when the correlation is greater than or equal to the threshold.

In operation 1140, for example, the electronic device may perform a designated operation depending on whether the electronic device 301 has entered the region of interest. For example, the designated operation may include at least one of notification of entry to the region of interest, information push, or information providing. The electronic device may perform a notification operation of notifying entry of the electronic device to the region of interest to applications/services corresponding to entry to the region of interest. The electronic device may also perform an information push operation of receiving an advertisement, a discount coupon, etc., from the applications/services corresponding to entry to the region of interest. The electronic device may also perform an information providing operation of providing location-based information (e.g., traffic information, bus line information, or famous restaurant information, etc.) from the applications/services corresponding to entry to the region of interest.

In operation 1150, for example, the electronic device may determine that the electronic device has not entered the region of interest when the correlation is less than the threshold. For example, when determining that the electronic device has not entered the region of interest, the electronic device may terminate determination of entry of the electronic device to the region of interest (route A) or perform operation 1160 (route B) to re-determine the entry of the electronic device to the region of interest by re-measuring the position estimation region of the electronic device.

According to an embodiment of the present disclosure, when determining that the electronic device has not entered the region of interest, the electronic device may further determine whether the electronic device has left the region of interest after entering the region of interest. When determining that the electronic device 301 enters the region of interest and then leaves the region of interest, the electronic device may perform an operation of notifying leaving of the electronic device from the region of interest to applications/services corresponding to leaving from the region of interest and then terminate the operation.

In operation 1160, when determining that the electronic device has not entered the region of interest, the electronic device may re-obtain the position estimation region thereof and determine whether to re-identify the entry to the region of interest. When determining to re-identify the entry to the region of interest in operation 1160, the electronic device performs operation 1170, when determining not to re-identify the entry to the region of interest in operation 1160, the electronic device may terminate determination of the entry to the region of interest.

According to an embodiment of the present disclosure, the electronic device may display a message asking whether to re-measure the position estimation region of the electronic device on the display to re-identify the entry of the electronic device to the region of interest. For example, the electronic device may determine whether to re-measure the position estimation region of the electronic device based on an input selected by the user in response to the message displayed on the display.

According to an embodiment of the present disclosure, the electronic device may automatically re-identify the entry of the electronic device to the region of interest. For example, when determining that the electronic device has not entered the region of interest, the electronic device may automatically go to operation 1170 to determine whether to re-identify the entry to the region of interest by re-obtaining the position estimation region of the electronic device.

When determining to re-identify the entry to the region of interest by re-obtaining the position estimation region of the electronic device in operation 1170, the electronic device may perform operation 1110 after a designated delay time. For example, the electronic device may go to operation 1110 to re-obtain the correlation based on the wireless network after the designated delay time. For example, when determining that the electronic device has not entered the region of interest by re-obtaining the position estimation region of the electronic device based on the wireless network, the electronic device may re-obtain the position estimation region thereof and determine whether to re-identify the entry to the region of interest. When determining to re-identify the entry to the region of interest in operation 1160, the electronic device performs operation 1170, when determining not to re-identify the entry to the region of interest in operation 1160, the electronic device may terminate determination of the entry to the region of interest.

According to an embodiment of the present disclosure, the electronic device may display a message asking whether to re-measure the position estimation region of the electronic device on the display to re-identify the entry of the electronic device to the region of interest. For example, the electronic device may determine whether to re-measure the position estimation region of the electronic device based on an input selected by the user in response to the message displayed on the display.

According to an embodiment of the present disclosure, the electronic device may automatically re-identify the entry of the electronic device to the region of interest. For example, when determining that the electronic device has not entered the region of interest, the electronic device may automatically determine go to operation 1170 to determine whether to re-identify the entry to the region of interest by re-obtaining the position estimation region of the electronic device.

When determining to re-identify the entry to the region of interest by re-obtaining the position estimation region of the electronic device in operation 1170, the electronic device may delay the operation for a designated delay time and then perform operation 1110. For example, the electronic device may go to operation 1110 to re-obtain the correlation based on the wireless network after the designated delay time. The electronic device may re-obtain the position estimation region of the electronic device based on the wireless network, re-obtain the correlation between probability density distributions for the re-obtained position estimation region and the region of interest, and re-identify the entry to the region of interest based on the re-obtained correlation.

The electronic device may re-determine whether the electronic device has entered the region of interest based on the re-obtained correlation between the probability density distributions for the position estimation region and the region of interest.

According to an embodiment of the present disclosure, the position estimation region of the electronic device obtained based on the first wireless network may include a coverage or a region that is larger than the position estimation region of the electronic device obtained based on the second wireless network. That is, the position estimation region of the electronic device obtained based on the second wireless network may have a higher precision than that of the position estimation region of the electronic device obtained based on the first wireless network, such that a precision of determination of entry of the electronic device to the region of interest may be higher in the position estimation region based on the second wireless network than in the position estimation region based on the first wireless network.

In the current embodiment, the method for identifying the entry of the electronic device to the region of interest is not limited to the described method, and it would be understood by those of ordinary skill in the art that the entry of the electronic device to the region of interest may be identified in various manners.

Figure 12:
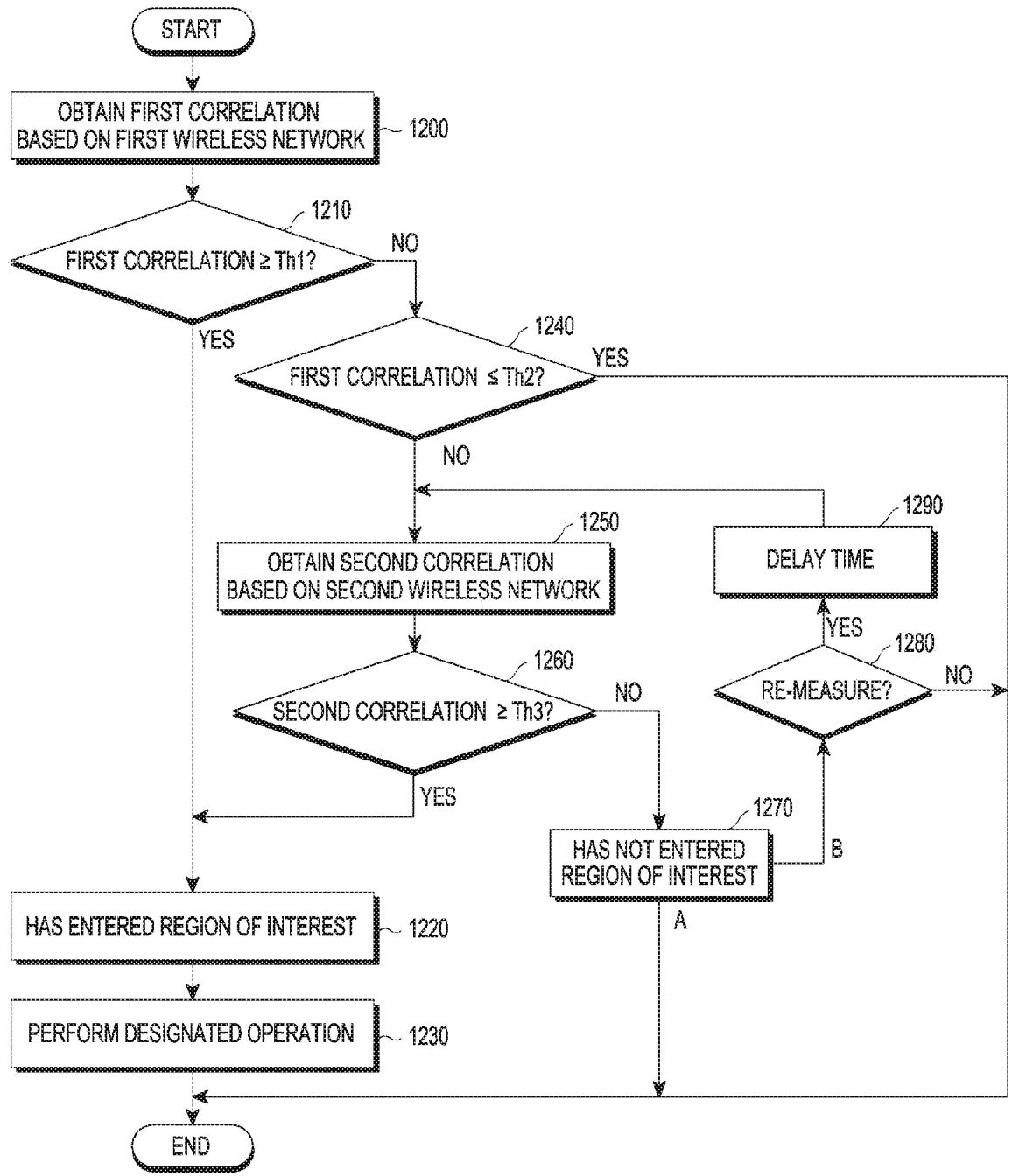
FIG. 12 is a flowchart illustrating a method for determining whether an electronic device has entered a region of interest, according to various embodiments.

FIG. 12 is a flowchart illustrating a method for determining whether an electronic device has entered a region of interest, according to various embodiments. FIG. 12 is a flowchart illustrating in detail the method for identifying the entry to the region of interest in operation 730 illustrated in FIG. 7, in which the method may include operations 1200 through 1290. The method may be performed by any one of the electronic device (e.g., the electronic device 301) or the processor (e.g., the processor 120 or the processor 360) of the electronic device.

In operation 1200, the electronic device may obtain a first correlation based on a first wireless network among a plurality of wireless networks. For example, the electronic device may obtain a first position estimation region of the electronic device based on the first wireless network, and obtain a first correlation between a probability density distribution for the obtained first position estimation region and a probability density distribution for the region of interest.

According to an embodiment of the present disclosure, the first wireless network may include a cellular-based network.

According to an embodiment of the present disclosure, as the first correlation is closer to 1, there is a high probability that the electronic device has entered the region of interest; as the first correlation is closer to 0, there is a low probability that the electronic device has entered the region of interest.

In operation 1210, for example, the electronic device may determine whether the first correlation is greater than or equal to a first threshold value Th1. In operation 1120, when the first correlation is greater than or equal to the first threshold Th1, the electronic device may perform operation 1220; when the first correlation is less than the first threshold Th1, the electronic device may perform operation 1240.

In operation 1220, for example, the electronic device may determine that the electronic device has entered the region of interest when the first correlation is greater than or equal to the first threshold Th1.

In operation 1230, for example, the electronic device may perform a designated operation depending on whether the electronic device has entered the region of interest. For example, the designated operation may include at least one of notification of entry to the region of interest, information push, or information providing. The electronic device may perform a notification operation of notifying entry of the electronic device to the region of interest to applications/services corresponding to entry to the region of interest. The electronic device may also perform an information push operation of receiving an advertisement, a discount coupon, etc., from the applications/services corresponding to entry to the region of interest. The electronic device may also perform an information providing operation of providing location-based information (e.g., traffic information, bus line information, or famous restaurant information, etc.) from the applications/services corresponding to entry to the region of interest.

In operation 1240, for example, when the first correlation is not either greater than or equal to the first threshold value Th1, the electronic device may determine whether the first correlation is less than or equal to a second threshold value Th2. When the first correlation is less than or equal to the second threshold value Th2 in operation 1240, the electronic device may perform operation 1270; when the first correlation is not either less than or equal to the second threshold Th2, the electronic device may perform operation 1250.

When the first correlation is not less than or equal to the second threshold Th2, that is, the first correlation is greater than or equal to (is greater than?) the first threshold value Th1 and the second threshold value Th2, the electronic device may obtain a second correlation based on a second wireless network among the plurality of wireless networks in operation 1250. For example, the electronic device may obtain a second position estimation region of the electronic device based on the second wireless network, and obtain a second correlation between a probability density distribution for the obtained second position estimation region and a probability density distribution for the region of interest.

According to an embodiment of the present disclosure, the second wireless network may include a WLAN-based network.

According to an embodiment of the present disclosure, as the second correlation is closer to 2, there is a high probability that the electronic device has entered the region of interest; as the second correlation is closer to 0, there is a low probability that the electronic device has entered the region of interest.

In operation 1260, for example, the electronic device may determine whether the second correlation is greater than or equal to a third threshold value Th3. In operation 1260, when the second correlation is greater than or equal to the third threshold Th3, the electronic device may perform operation 1220 to determine that the electronic device has entered the region of interest, when the second correlation is less than the first threshold Th3, the electronic device may perform operation 1270.

In operation 1270, for example, the electronic device may determine that the electronic device has not entered the region of interest when the second correlation is less than the third threshold Th3. For example, when determining that the electronic device has not entered the region of interest, the electronic device may terminate determination of entry of the electronic device to the region of interest (route A) or perform operation 1280 (route B) to re-determine the entry of the electronic device to the region of interest by re-measuring a second position estimation region of the electronic device based on the second wireless network.

According to an embodiment of the present disclosure, when determining that the electronic device has not entered the region of interest, the electronic device may further determine whether the electronic device has left the region of interest after entering the region of interest. When determining that the electronic device 301 enters the region of interest and then leaves the region of interest, the electronic device may perform an operation of notifying leaving of the electronic device from the region of interest to applications/services corresponding to leaving from the region of interest and then terminate the operation.

In operation 1280, when determining that the electronic device has not entered the region of interest, the electronic device may re-obtain the second position estimation region thereof and determine whether to re-identify the entry to the region of interest. When determining to re-identify the entry to the region of interest in operation 1280, the electronic device performs operation 1290; when determining not to re-identify the entry to the region of interest in operation 1160, the electronic device may terminate determination of the entry to the region of interest.

According to an embodiment of the present disclosure, the electronic device may display a message asking whether to re-measure the position estimation region of the electronic device on the display to re-identify the entry of the electronic device to the region of interest. For example, the electronic device may determine whether to re-measure the second position estimation region of the electronic device based on the second wireless network according to an input selected by the user in response to the message displayed on the display.

According to an embodiment of the present disclosure, the electronic device may automatically re-identify the entry of the electronic device to the region of interest. For example, when determining that the electronic device has not entered the region of interest, the electronic device may automatically go to operation 1200 to determine whether to re-identify the entry to the region of interest by re-obtaining the second position estimation region of the electronic device based on the second wireless network.

When determining to re-identify the entry to the region of interest by re-obtaining the second position estimation region of the electronic device based on the second wireless network in operation 1290, the electronic device may delay the operation for a designated delay time and then perform operation 1200. For example, the electronic device may go to operation 1200 to re-obtain the second correlation based on the second wireless network after the designated delay time. The electronic device may re-obtain the second position estimation region of the electronic device based on the second wireless network and re-determine whether the electronic device has entered the region of interest based on the second correlation between probability density distributions for the re-obtained second position estimation region and the region of interest.

According to an embodiment of the present disclosure, the first position estimation region of the electronic device obtained based on the first wireless network may include a coverage or a region that is larger than the second position estimation region of the electronic device obtained based on the second wireless network. That is, the second position estimation region of the electronic device obtained based on the second wireless network may have a higher precision than that of the first position estimation region of the electronic device obtained based on the first wireless network, such that a precision of determination of entry of the electronic device to the region of interest may be higher in the position estimation region based on the second wireless network than in the position estimation region based on the first wireless network.

In the current embodiment, the method for identifying the entry of the electronic device to the region of interest is not limited to the described method, and it would be understood by those of ordinary skill in the art that the entry of the electronic device to the region of interest may be identified in various manners.

According to various embodiments of the present disclosure, a method for determining whether an electronic device has entered a region of interest may include obtaining a position estimation region of the electronic device based on at least one network, obtaining a correlation between a probability distribution for the obtained position estimation region and a probability distribution for the region of interest, and determining whether the electronic device has entered the region of interest based on the obtained correlation.

According to various embodiments of the present disclosure, the method may further include transforming the obtained position estimation region into the probability distribution for the obtained position estimation region by normalizing the obtained position estimation region and transforming the region of interest into the probability distribution for the region of interest by normalizing the region of interest.

According to various embodiments of the present disclosure, the obtaining of the correlation may include generating a probability distribution for a coupling region in a point of a distance between the probability distribution for the obtained position estimation region and the probability distribution for the region of interest, calculating a first distance between the probability distribution for the obtained position estimation region and the generated probability distribution for the coupling region, calculating a second distance by applying a weight value to a distance between the probability distribution for the preset region of interest and the generated probability distribution for the coupling region, and deriving the correlation based on the calculated first distance and the calculated second distance.

According to various embodiments of the present disclosure, the generating of the probability distribution for the coupling region may include presetting at least one parameter for determining the probability distribution for the coupling region and generating the probability distribution for the coupling region in the point by transforming the coupling region into a normal distribution based on the preset at least one parameter.

According to various embodiments of the present disclosure, the deriving of the correlation may include summing the calculated first distance and the calculated second distance and calculating the correlation by converting a result of the summing into a value corresponding to the result of the summing between 0 and 1.

According to various embodiments of the present disclosure, the determining of whether the electronic device has entered the region of interest may include determining whether the electronic device has entered the preset region of interest, based on a second correlation obtained based on the second network, when a first correlation obtained based on the first network is a value between a first threshold value and a second threshold value.

According to various embodiments of the present disclosure, the determining of whether the electronic device has entered the region of interest may include determining that the electronic device has entered the preset region of interest when the first correlation is greater than or equal to the first threshold value, and determining that the electronic device has not entered the preset region of interest when the first correlation is less than or equal to the second threshold value.

According to various embodiments of the present disclosure, the determining of whether the electronic device has entered the region of interest may include determining that the electronic device has entered the preset region of interest when the second correlation is greater than or equal to the first threshold value, and determining that the electronic device has not entered the preset region of interest when the second correlation is less than or equal to the second threshold value.

According to various embodiments of the present disclosure, the determining of whether the electronic device has entered the region of interest may include updating the second correlation based on the second network after a preset delay time when the second correlation is a value between the first threshold value and the second threshold value.

As used herein, the term "module" may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming circuit. When the instructions are executed by one or more processors (for example, the processor 120), the one or more processors may perform functions corresponding to the instructions. The computer-readable storage medium may be, for example, a memory included in the memory 130.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a complier and a high-level language code executable by a computer using an interpreter. The foregoing hardware device may be configured to be operated as at least one software module to perform an operation of the present disclosure, or vice versa.

Circuits or programming circuits according to various embodiments of the present disclosure may include one or more of the foregoing elements, have some of the foregoing elements omitted, or further include additional other elements. Operations performed by the circuits, the programming circuits or other elements according to various embodiments of the present disclosure may be executed in a sequential, parallel, repetitive or heuristic manner. Also, some of the operations may be executed in different order or omitted, or may have additional different operations.

According to various embodiments of the present disclosure, a storage medium has stored therein instructions that cause, when executed by at least one processor, the at least one processor to perform at least one operation including obtaining a position estimation region of the electronic device based on at least one network, obtaining a correlation between a probability distribution for the obtained position estimation region and a probability distribution for the region of interest, and determining whether the electronic device has entered the region of interest based on the obtained correlation.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
 a communication circuit configured to communicate with at least one network; and
 a processor configured to:
 obtain a position estimation region of the electronic device based on a first network among the at least one network via the communication circuit;
 transform the obtained position estimation region into a probability distribution for the obtained position estimation region by normalizing the obtained position estimation region:
 transform a preset region of interest into a probability distribution for the preset region of interest by normalizing the preset region of interest; and
 determine whether the electronic device has entered the preset region of interest, based on a correlation between the probability distribution for the obtained position estimation region and the probability distribution for the preset region of interest.

2. The electronic device of claim 1, wherein the processor is further configured to:
 obtain a probability distribution for a coupling region the probability distribution for the obtained position estimation region and the probability distribution for the preset region of interest;
 obtain a first distance between the probability distribution for the obtained position estimation region and the obtained probability distribution for the coupling region;
 obtain a second distance by applying a weight value to a distance between the probability distribution for the preset region of interest and the obtained probability distribution for the coupling region; and obtain the correlation based on the obtained first distance and the obtained second distance.

3. The electronic device of claim 1, wherein the communication circuit comprises:
   a first communication circuit configured to communicate with the first network among the at least one network; and
   a second communication circuit configured to communicate with a second network among the at least one network.

4. The electronic device of claim 3, wherein the first network comprises a cellular-based network, and
   the second network comprises a wireless local area network (WLAN)-based network.

5. The electronic device of claim 3, wherein the processor is further configured to determine whether the electronic device has entered the preset region of interest, based on a second correlation obtained based on the second network, when the correlation obtained based on the first network is a value between a first threshold value and a second threshold value.

6. The electronic device of claim 5, wherein the processor is configured to:
   determine that the electronic device has entered the preset region of interest when the first correlation is greater than or equal to the first threshold value; and
   determine that the electronic device has not entered the preset region of interest when the first correlation is less than or equal to the second threshold value.

7. The electronic device of claim 5, wherein the processor is configured to:
   determine that the electronic device has entered the preset region of interest when the second correlation is greater than or equal to the first threshold value; and
   determine that the electronic device has not entered the preset region of interest when the second correlation is less than or equal to the second threshold value.

8. The electronic device of claim 5, wherein the processor is further configured to update the second correlation based on the second network after a preset delay time when the second correlation is a value between the first threshold value and the second threshold value.

9. The electronic device of claim 1, wherein the processor is further configured to perform a preset action based on a result of determination of whether the electronic device has entered the preset region of interest.

10. The electronic device of claim 9, wherein the preset action comprises a notification service operation indicating entry or leaving of the electronic device to or from the preset region of interest.

11. A method for identifying entry of an electronic device to a region of interest, the method comprising:
   obtaining a position estimation region of the electronic device based on a first network among at least one network;
   transforming the obtained position estimation region into a probability distribution for the obtained position estimation region by normalizing the obtained position estimation region;
   transforming a region of interest into a probability distribution for the region of interest by normalizing the region of interest;
   obtaining a correlation between a the probability distribution for the obtained position estimation region and the probability distribution for the region of interest; and
   determining whether the electronic device has entered the region of interest based on the obtained correlation.

12. The method of claim 11, wherein obtaining the correlation comprises:
   obtaining a probability distribution for a coupling region between the probability distribution for the obtained position estimation region and the probability distribution for the region of interest;
   obtaining a first distance between the probability distribution for the obtained position estimation region and the obtained probability distribution for the coupling region;
   obtaining a second distance by applying a weight value to a distance between the probability distribution for the region of interest and the obtained probability distribution for the coupling region; and
   obtaining the correlation based the obtained first distance and the obtained second distance.

13. The method of claim 12, wherein obtaining the probability distribution for the coupling region comprises:
   presetting at least one parameter for determining the probability distribution for the coupling region; and
   obtaining the probability distribution for the coupling region by transforming the coupling region into a normal distribution based on the preset at least one parameter.

14. The method of claim 12, wherein obtaining the correlation comprises:
   summing the obtained first distance and the obtained second distance; and
   obtaining the correlation by converting a result of the summing into a value corresponding to the result of the summing between 0 and 1.

* * * * *